(12) United States Patent
Horiguchi et al.

(10) Patent No.: US 12,654,319 B2
(45) Date of Patent: Jun. 16, 2026

(54) ROBOT, ROBOT CONTROL METHOD, ARTICLE MANUFACTURING METHOD USING ROBOT, AND CONTROL PROGRAM AND STORAGE MEDIUM

(71) Applicant: CANON KABUSHIKI KAISHA, Tokyo (JP)

(72) Inventors: Haruhiko Horiguchi, Tokyo (JP); Akira Yajima, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 18/489,750

(22) Filed: Oct. 18, 2023

(65) Prior Publication Data

US 2024/0139948 A1　May 2, 2024

(30) Foreign Application Priority Data

Oct. 26, 2022　(JP) ................................. 2022-171844

(51) Int. Cl.
　*B25J 9/16*　　　(2006.01)
　*B25J 13/06*　　(2006.01)
(52) U.S. Cl.
　CPC ........... *B25J 9/1664* (2013.01); *B25J 9/1671* (2013.01); *B25J 13/06* (2013.01)
(58) Field of Classification Search
　None
　See application file for complete search history.

(56) References Cited

U.S. PATENT DOCUMENTS

| | | | | |
|---|---|---|---|---|
| 2011/0071676 A1* | 3/2011 | Sanders | ................ | B25J 9/1661 |
| | | | | 700/250 |
| 2018/0297204 A1* | 10/2018 | Krasny | .................... | B25J 9/163 |
| 2020/0047355 A1* | 2/2020 | Fukumoto | ............ | B25J 19/0054 |
| 2020/0189106 A1* | 6/2020 | Tsuchiya | ................ | B25J 9/1674 |
| 2022/0388156 A1* | 12/2022 | Hansen | ................ | G05B 19/423 |
| 2024/0131706 A1* | 4/2024 | Sundaralingam | ...... | B25J 9/1664 |

FOREIGN PATENT DOCUMENTS

| | | | | | |
|---|---|---|---|---|---|
| CN | 110696000 A | * | 1/2020 | ............ | B25J 9/1605 |
| JP | H05345291 A | | 12/1993 | | |
| JP | H07319547 A | | 12/1995 | | |
| JP | 2005074539 A | * | 3/2005 | | |
| JP | 2014034095 A | | 2/2014 | | |
| JP | 2016107384 A | | 6/2016 | | |
| JP | 2018144136 A | | 9/2018 | | |
| JP | 2018199172 A | | 12/2018 | | |
| JP | 2020028957 A | | 2/2020 | | |
| JP | 2020059122 A | * | 4/2020 | | |
| WO | 2016103297 A1 | | 6/2016 | | |
| WO | WO2016189896 A1 | | 12/2016 | | |

* cited by examiner

*Primary Examiner* — Khoi H Tran
*Assistant Examiner* — Dairon Estevez
(74) *Attorney, Agent, or Firm* — Canon U.S.A., Inc., IP Division

(57) ABSTRACT

A robot including one or more joints is configured to, when a particular joint among the joints has not been driven for a predetermined time, move the particular joint such that the robot refrains from coming into contact with a surrounding object or such that the robot comes into contact with the surrounding object while preventing a force applied to the robot from reaching a predetermined level or higher.

27 Claims, 15 Drawing Sheets

Figures 13A, 13B:
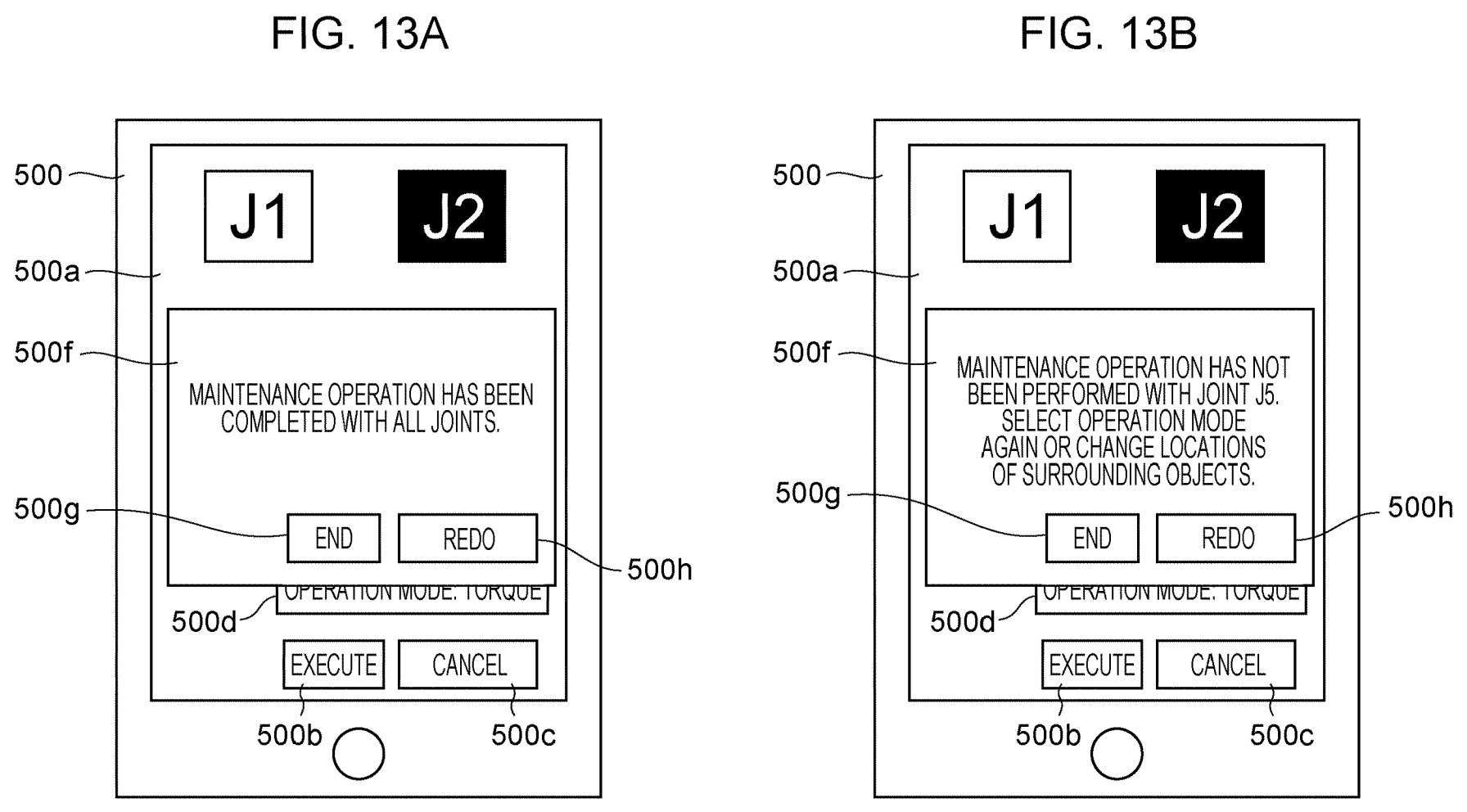

MAINTENANCE OPERATION HAS BEEN
COMPLETED WITH ALL JOINTS.

J1    J2

END    REDO    500h

500g

OPERATION MODE: TORQUE

500d

EXECUTE    CANCEL    500c

MAINTENANCE OPERATION HAS NOT
BEEN PERFORMED WITH JOINT J5.
SELECT OPERATION MODE
AGAIN OR CHANGE LOCATIONS
OF SURROUNDING OBJECTS.

J1    J2

END    REDO    500h

500g

OPERATION MODE: TORQUE

500d

EXECUTE    CANCEL    500c

500b

ROBOT, ROBOT CONTROL METHOD, ARTICLE MANUFACTURING METHOD USING ROBOT, AND CONTROL PROGRAM AND STORAGE MEDIUM

BACKGROUND

Field of the Disclosure

The present disclosure relates to a robot.

Description of the Related Art

In recent years, attention has been focused on robots having multiple links that can be moved by multiple joints. These robots can manipulate parts using end effectors at the distal ends of the robots by operating the multiple links. Such robots are installed in production factories to achieve automation in the production factories. The robot joint described above has multiple mechanical parts such as a speed reducer, a crossed roller bearing, a bearing, an oil seal, a belt and an encoder, and a torque sensor. When a robot having such parts has not been driven for a certain period, the following problems can occur.

When the robot has not been driven for a certain period, for example, at the speed reducer, the crossed roller bearing, the bearing, and/or the oil seal, grease applied to these parts can seep out, become uneven, or vaporize; or part of the grease can come off. At the encoder and/or the torque sensor, seeping or vaporizing grease can adhere, leading to problems.

To avoid these cases, Japanese Patent Laid-Open No. 2014-34095 (Patent literature 1) discloses a technology for multi-joint robots having multiple joints and multiple links; this technology provides the multi-joint robots with a function of notifying the user that an inactive joint exists when the joint has remained inactive for a certain period during a work cycle. In accordance with this notification, the user can provide an instruction to perform an operation that causes the joint, which has remained inactive for a certain period, to move. As a result, a maintenance operation can be performed, such as spreading grease over the parts including the speed reducer that are contained in the joint that has remained inactive for a certain period.

SUMMARY

In the present disclosure, a robot including one or more joints is configured to, when a particular joint among the joints has not been driven for a predetermined time, move the particular joint such that the robot refrains from coming into contact with a surrounding object or such that the robot comes into contact with the surrounding object while preventing a force applied to the robot from reaching a predetermined level or higher.

Further features of the present disclosure will become apparent from the following description of embodiments with reference to the attached drawings.

BRIEF DESCRIPTION OF THE DRAWINGS

FIG. 1 is a schematic diagram of a robot system according to an embodiment.
FIG. 2 is a control block diagram of a robot system according to an embodiment.

FIGS. 13A and 13B illustrate indications.

DESCRIPTION OF THE EMBODIMENTS

Figure 3:
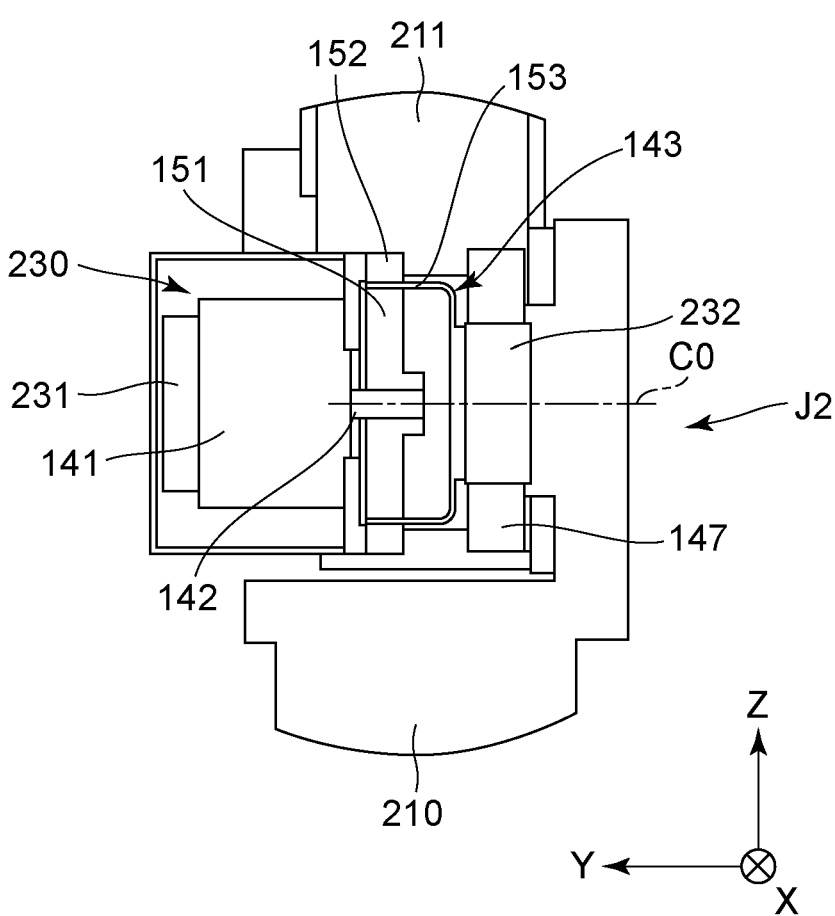
FIG. 3 is a schematic diagram of a joint according to an embodiment.

The technology described in Patent literature 1, however, can lead to, for example, the problem that some user might avoid executing the maintenance operation described above, which is different from the operations previously taught to the robot, because the users have concerns that the robot could interfere with surrounding objects.

The present disclosure eliminates or minimizes interference between a robot and surrounding objects when a maintenance operation is performed because a joint of the robot has not been driven for a certain period (a predetermined time). By eliminating or minimizing interference, the present disclosure encourages users to execute maintenance operations.

Hereinafter, embodiments of the present disclosure will be described with reference to examples illustrated in the accompanying drawings. The examples described below are merely illustrative. For instance, those skilled in the art may modify minor configurational features as needed without departing from the spirit of the present disclosure. Numerical values in the embodiments are numerical values and should not be interpreted as limiting the present disclosure. In the drawings described below, arrows X, Y, and Z indicate the overall coordinate system of a robot system. In most cases, the XYZ three-dimensional coordinate system represents the world coordinate system of the entire installation. In some cases, for example, for reasons of control, the local coordinate system can apply to parts such as a robot hand, a finger, and joints as needed.

First Embodiment

Figure 1:
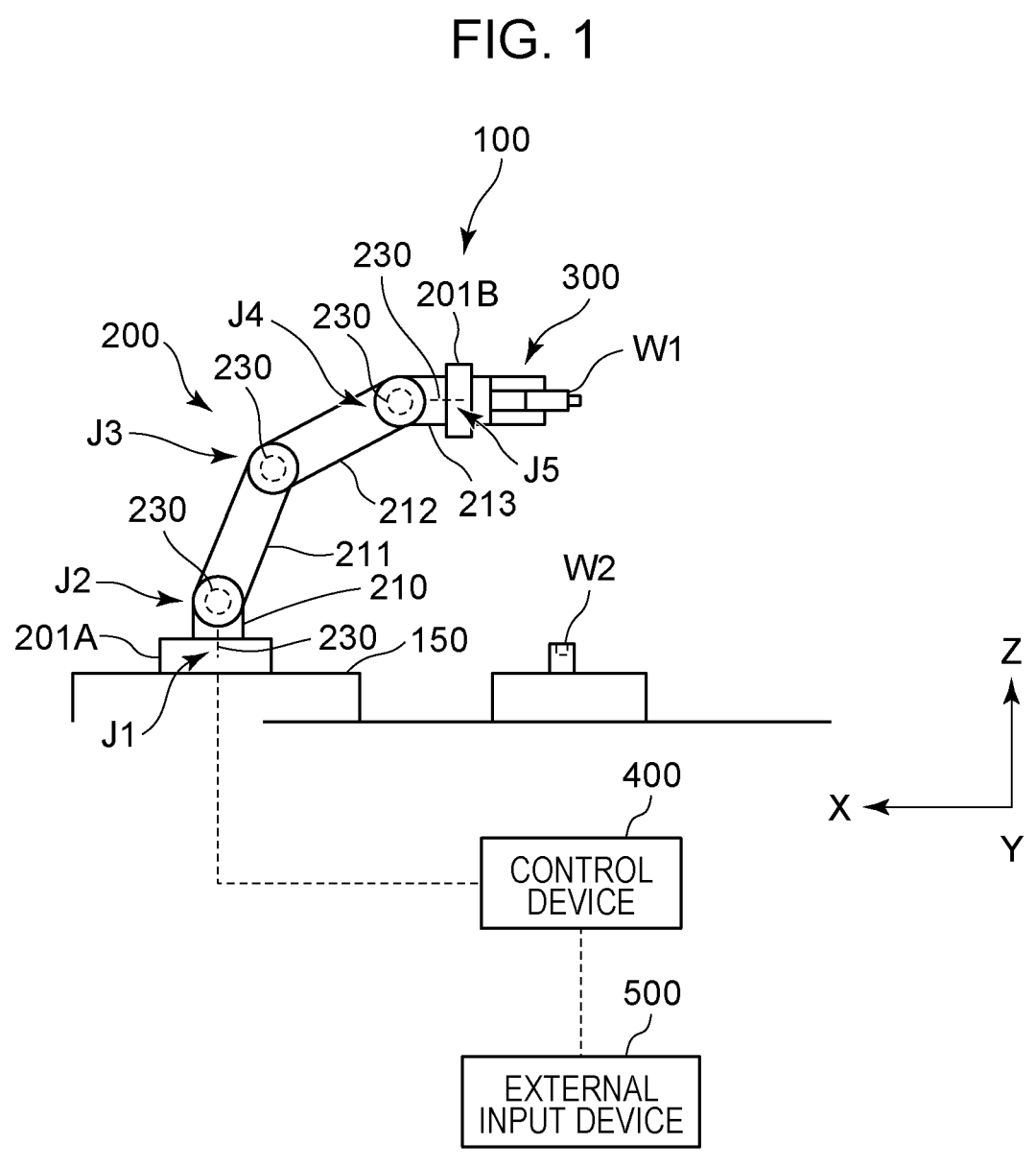

FIG. 1 is a schematic diagram of a robot system (a robotic apparatus) 100 according to the present embodiment.

FIG. 1 illustrates a side (an XZ plane) of the robot system 100 of the present embodiment as an example. As illustrated in FIG. 1, the robot system 100 includes a robot arm body 200, which is a robot main body, and a robot hand body 300. The robot system 100 also includes a control device 400 for controlling the robot arm body 200 and the robot hand body 300 and an external input device 500.

The external input device 500 is connected to the control device 400. The control device 400 and the external input device 500 constitute a control system of the robot arm body 200.

An example of the external input device 500 is a teaching device such as a teach pendant. The external input device 500 can be used by an operator to designate the location of the robot arm body 200 and the location of the robot hand body 300. In the present embodiment, the case in which a robot hand is attached as an end effector to the distal end of the robot arm body 200 is described. However, this should not be interpreted as limiting, and the end effector may be a tool such as a polishing tool, cutting tool, driver, or probe.

The robot arm body 200 illustrated in FIG. 1 is a robot arm including multiple links that are coupled to each other by multiple joints (five shafts), for example, in a serial-link manner. The robot hand body 300 is coupled to a link 201B at the distal end of the robot arm body 200. A base 201A, links 210, 211, 212, and 213, and the link 201B of the robot arm body 200 are coupled by, for example, joints, specifically joints J1, J2, J3, J4, and J5 in the present embodiment, in the following manner. The base 201A is fixed on a stand 150.

The joints J1 to J5 include multiple (five) arm driving devices 230 that are drive sources for rotating the joints on corresponding rotary shafts. Arm driving devices having adequate output for necessary torque are used as the arm driving devices 230 of the joints. Each of the arm driving devices 230 includes an encoder 231 (FIG. 2) for detecting the rotational location of the corresponding motor output shaft. Each of the joints J1 to J5 includes a torque sensor 232 (FIG. 2) capable of detecting torque as information about the force exerted on the individual links 210 to 213, and 201B.

The base 201A and the link 210 of the robot arm body 200 are coupled by the joint J1, which is rotatable on the rotary shaft parallel to the Z-axis direction. The joint J1 is movable, for example, within the range of about ±180 degrees from the initial position. The links 210 and 211 of the robot arm body 200 are coupled by the joint J2, which is rotatable on the rotary shaft parallel to the Y-axis direction. The joint J2 is movable, for example, within the range of about ±80 degrees from the initial position.

The links 211 and 212 of the robot arm body 200 are coupled by the joint J3, which is rotatable on the rotary shaft parallel to the Y-axis direction. The joint J3 is movable, for example, within the range of about ±70 degrees from the initial position. The links 212 and 213 of the robot arm body 200 are coupled by the joint J4, which is rotatable on the rotary shaft parallel to the Y-axis direction. The joint J4 is movable, for example, within the range of about ±120 degrees from the initial position.

The links 213 and 201B of the robot arm body 200 are coupled by the joint J5, which is rotatable on the rotary shaft parallel to the X-axis direction. The joint J5 is movable, for example, within the range of about ±180 degrees from the initial position.

The robot hand body 300 is coupled to the distal end of the link 201B of the robot arm body 200. The robot hand body 300 is, for example, an (electric-powered) hand or (air pressure-driven) air-powered hand for assembly or transportation in production lines. The robot hand body 300 is fixed to the link 201B by (semi-) fixing means (not illustrated in the drawing), such as screws, or attachable to the link 201B by attaching means (not illustrated in the drawing), such as latches (ratchets). In particular, when the robot hand body 300 can be attached in a detachable manner, one conceivable method is to control the robot arm body 200 to attach the robot hand body 300 provided at a supply location (not illustrated in the drawing) or replace one robot hand body 300 with another robot hand body 300 provided at the supply location.

As used herein, a hand portion of the robot arm body 200 refers to the robot hand body 300 in the present embodiment. While the robot hand body 300 holds an object, the hand portion of the robot arm body 200 refers to the robot hand body 300 and the object (for example, a part or tool) being held as a whole. Overall, irrespective of whether the robot hand body 300 holds an object, the hand portion refers to the robot hand formed as the robot hand body 300.

The external input device 500 is provided with an operating unit including operating keys for, for example, changing the position (location and angle) of the joints of the robot arm body 200 or moving the hand portion of the robot arm body 200. When an operation is performed on the operating unit of the external input device 500, the control device 400, in response to this operation on the external input device 500, transmits signals to the drive sources of the joints through communication lines to control motions of the robot arm body 200. At this time, the control device 400 runs a robot control program including a control program described later to control the individual parts of the robot arm body 200.

This configuration causes the robot arm body 200 to move the robot hand body 300 to any location and perform a desired operation. For example, using workpieces W1 and W2 as materials, an assembly operation is performed with the workpieces W1 and W2. As a result, an assembled workpiece is produced as a product. In this manner, the robot arm body 200 can be used to manufacture articles.

Figure 2:
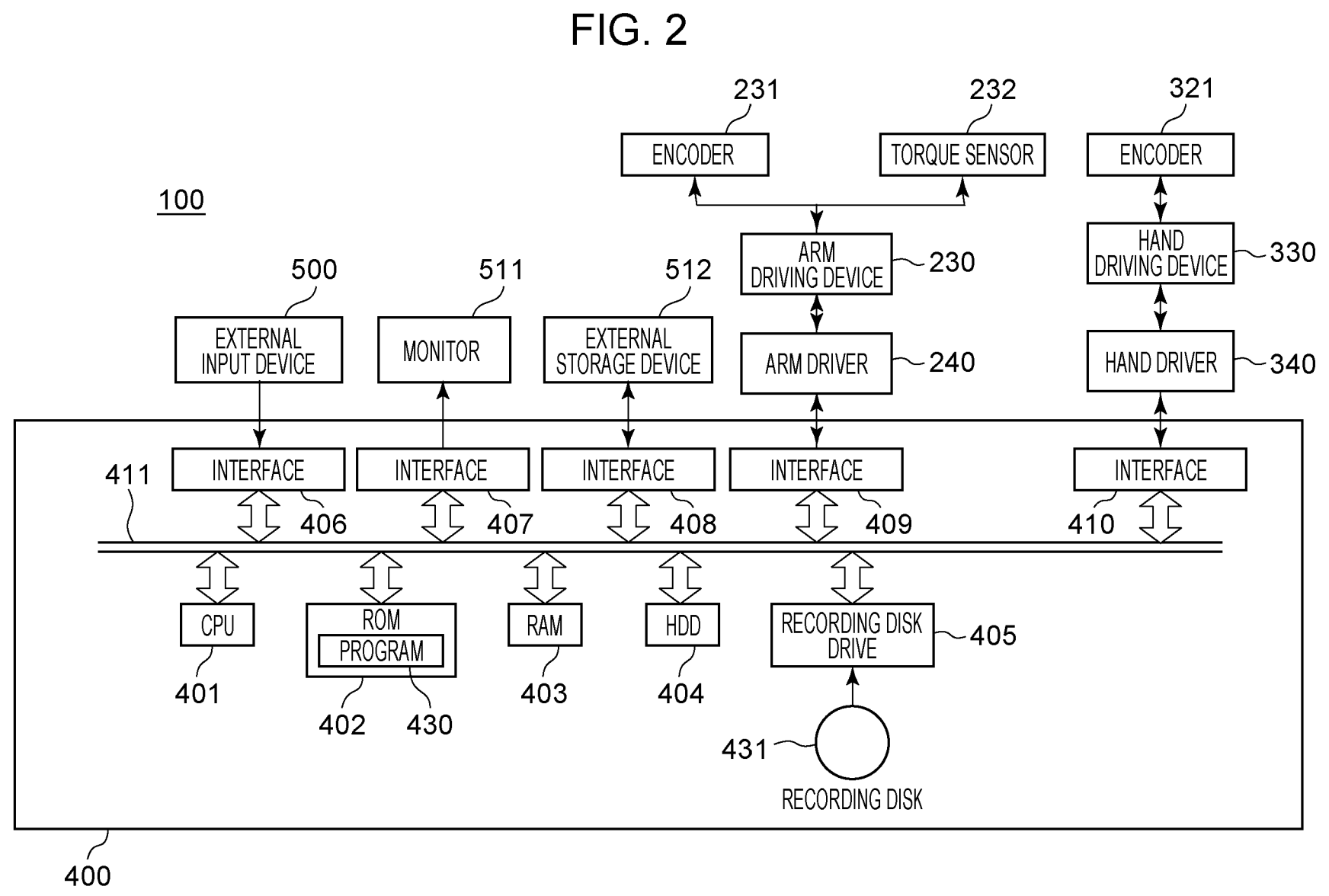

FIG. 2 is a block diagram illustrating a detailed configuration of a control system of the robot system 100 in FIG. 1. The control device 400 is implemented by a computer. The control device 400 includes a central processing unit (CPU) 401, which is a processor. The control device 400 also includes a read-only memory (ROM) 402, a random-access memory (RAM) 403, a hard disc drive (HDD) 404, and a recording disk drive 405 as storage units. The control device 400 also includes interfaces 406, 407, 408, 409, and 410 for communicating with different devices. The CPU 401, the ROM 402, the RAM 403, and the interfaces 406 to 410 are communicatively coupled to each other by a bus 411.

The RAM 403 is usable to temporarily store data of, for example, teaching points and control instructions that are inputted on the external input device 500. A basic program 430, such as BIOS, for causing the CPU 401 to perform various computational operations is stored in the ROM 402. The CPU 401 is operable to perform various computational operations in accordance with a control program recorded (stored) in the HDD 404. The HDD 404 is a storage unit for storing, for example, various kinds of data that are obtained as a result of computational operations performed by the CPU 401. The recording disk drive 405 is operable to read various kinds of data and control programs that are recorded in a recording disk 431. A monitor 511 for displaying various images and an external storage device 512, which is, for example a rewritable non-volatile memory or external HDD, are coupled to the interfaces 407 and 408.

One conceivable example of the external input device 500 is an operating device such as a teach pendant (TP). The external input device 500 may, however, be another kind of computer device (a personal computer (PC) or server) capable of editing a robot program. The external input device 500 is connectable to the control device 400 by wired or wireless communication connection means. The external input device 500 functions as a user interface for robot control, condition indication, and other operations. The target joint angles of the joints J1 to J5 can be inputted using the external input device 500 and then outputted to the CPU 401 via the interface 406 and the bus 411.

The CPU 401 is able to receive via the interface 406, for example, teaching point data that is inputted using the external input device 500. The CPU 401 is operable to calculate the courses of the shafts of the robot arm body 200 based on the teaching point data that is inputted using the external input device 500 and transmit the courses through the interface 409 via an arm driver 240 to the arm driving devices 230. The CPU 401 is operable to output data of a driving instruction indicating a target degree for controlling the rotation angle of each arm driving device 230 at predetermined time intervals through the bus 411 and the interface 409 to the arm driver 240.

The arm driver 240 is operable to calculate, based on the driving instruction inputted from the CPU 401, the amount of current to be outputted to each arm driving device 230 and supply the current to each arm driving device 230 to control the angles of the joints J1 to J5. The arm driver 240 is also operable to output detection signals from the encoders 231 and the torque sensors 232 through the interface 409 and the bus 411 to the CPU 401. Specifically, the CPU 401 is operable to perform feedback control on the arm driving devices 230 using the arm driver 240 such that the present joint angle of each of the joints J1 to J5, detected by the corresponding encoder 231, matches the target joint angle. Similarly, the CPU 401 is operable to perform feedback control on the arm driving devices 230 such that the present torque of each of the joints J1 to J5, detected by the corresponding torque sensor 232, matches the target torque. In the present embodiment, one arm driver 240 is provided. However, each arm driving device 230 may be provided with one arm driver.

The control device 400 is also coupled to a hand driving device 330 via the interface 410 and a hand driver 340. The hand driver 340 is operable to calculate, based on the driving instruction inputted from the CPU 401, the amount of current to be outputted to the hand driving device 330 and supply the current to the hand driving device 330 to control the speed of the hand driving device 330. The hand driver 340 is also operable to output a pulse signal from an encoder 321 through the interface 410 and the bus 411 to the CPU 401. Specifically, the CPU 401 is operable to perform feedback control on the hand driving device 330 using the hand driver 340 such that the present location and/or present speed of the hand driving device 330, detected by the encoder 321, matches the target location and/or target speed.

One of the torque sensors 232 is provided to detect (obtain) the drive torque (rotational driving force) of the arm driving device 230 that drives the joint J2 in FIG. 1, that is, the drive torque applied from the arm driving device 230 to the link 211. This torque sensor 232 is disposed at, for example, a given location on the drive shaft of the drive system formed by the arm driving devices 230 or speed reducer provided inside the joint J2.

In the present embodiment, the joint J2 will be used as an example to describe details of the configuration and placement location of the torque sensor 232 using drawings. A known configuration may be applied to the torque sensor 232, which is operable to measure the drive torque of a corresponding joint. The same torque sensor as the torque sensor 232 is used in the other joints J1, J3, J4, and J5.

The arm driving devices 230 provided for the joints J1 to J5 of the robot arm body 200 in FIG. 1 and the hand driving device 330 provided for the robot hand body 300 may be driven by, for example, electric motors. In this case, a speed reducer using, for example, a harmonic gear mechanism may be used as well as a motor. For a robot hand such as a hand or gripper, a speed reducing or drive direction changing mechanism such as a rack and pinion may be used. The motors for driving the joints J1 to J5 (and the robot hand body 300) are respectively disposed at given locations in the joints J1 to J5 (and the robot hand body 300). In the present embodiment, these motors (and the speed reducer) are disposed inside, but the motors (and the speed reducer) may be disposed outside.

FIG. 3 is a ZY sectional view of the joint J2 according to the present embodiment. The joint J2 will be used as an example in the description based on FIG. 3, but the same holds for the other joints J1, J3, J4, and J5. The arm driving device 230 of the joint J2 includes an electric-powered motor 141 that is a rotational drive source, a speed reducer 143 coupled to a rotary shaft member 142 of the motor 141, configured to reduce the speed of rotation of the rotary shaft member 142 and output the rotation, the encoder 231 for identifying the location of the rotary shaft member 142, and the torque sensor 232. The rotary shaft member 142 of the motor 141 is rotatable on a rotation axis line CO. The links 210 and 211 are coupled via a crossed roller bearing 147 in a pivotable manner. The motor 141 is a servo motor such as a brushless direct-current (DC) servo motor or alternating-current (AC) servo motor.

The speed reducer 143 is a harmonic gear speed reducer in the present embodiment. The speed reducer 143 includes a wave generator 151, which is an example of an input shaft, coupled to the rotary shaft member 142 of the motor 141, and a circular spline 152, which is an example of an output shaft, fixed to the link 211. The circular spline 152 is coupled to the link 211, but the circular spline 152 may be formed together with the link 211 in a combined manner. The speed reducer 143 also includes a flex spline 153 disposed between the wave generator 151 and the circular spline 152, coupled to the link 210 via the torque sensor 232.

The flex spline 153 is shaped as a cup. The flex spline 153 can be deformed into an oval by the wave generator 151. The flex spline 153 can engage with the circular spline 152 at portions on the long axis of the oval. When the wave generator 151 rotates, the rotation swivels the long axis of the oval of the flex spline 153, so that the locations at which the flex spline 153 is engaged with the circular spline 152 move in the direction of the rotation of the wave generator 151. While the wave generator 151 performs one rotation, the circular spline 152 rotates by the difference in number of teeth between the flex spline 153 and the circular spline 152 with respect to the flex spline 153.

As a result, the speed of the circular spline 152 is reduced by a given deceleration ratio with respect to the rotation of the wave generator 151, and the circular spline 152 rotates relative to the flex spline 153. The link 211 coupled to the circular spline 152 accordingly pivots on the rotation axis line CO, relative to the link 210 coupled to the flex spline 153 via the torque sensor 232.

The torque sensor 232 is disposed at the flex spline 153, which is the output side of the speed reducer 143. In other words, the torque sensor 232 is disposed between the link 210 and the flex spline 153 of the speed reducer 143, that is, between the link 210, which is an example of a first link, and the link 211, which is an example of a second link. The torque sensor 232 is operable to measure (obtain) the torque on the rotation axis line CO, exerted between the links 210 and 211 and output an electrical signal (a digital signal) corresponding to a torque value that is the measured value (the obtained value) to the control device 400. In this manner, the control device 400 is able to control the robot arm body 200, based on the torque value.

Figure 4:
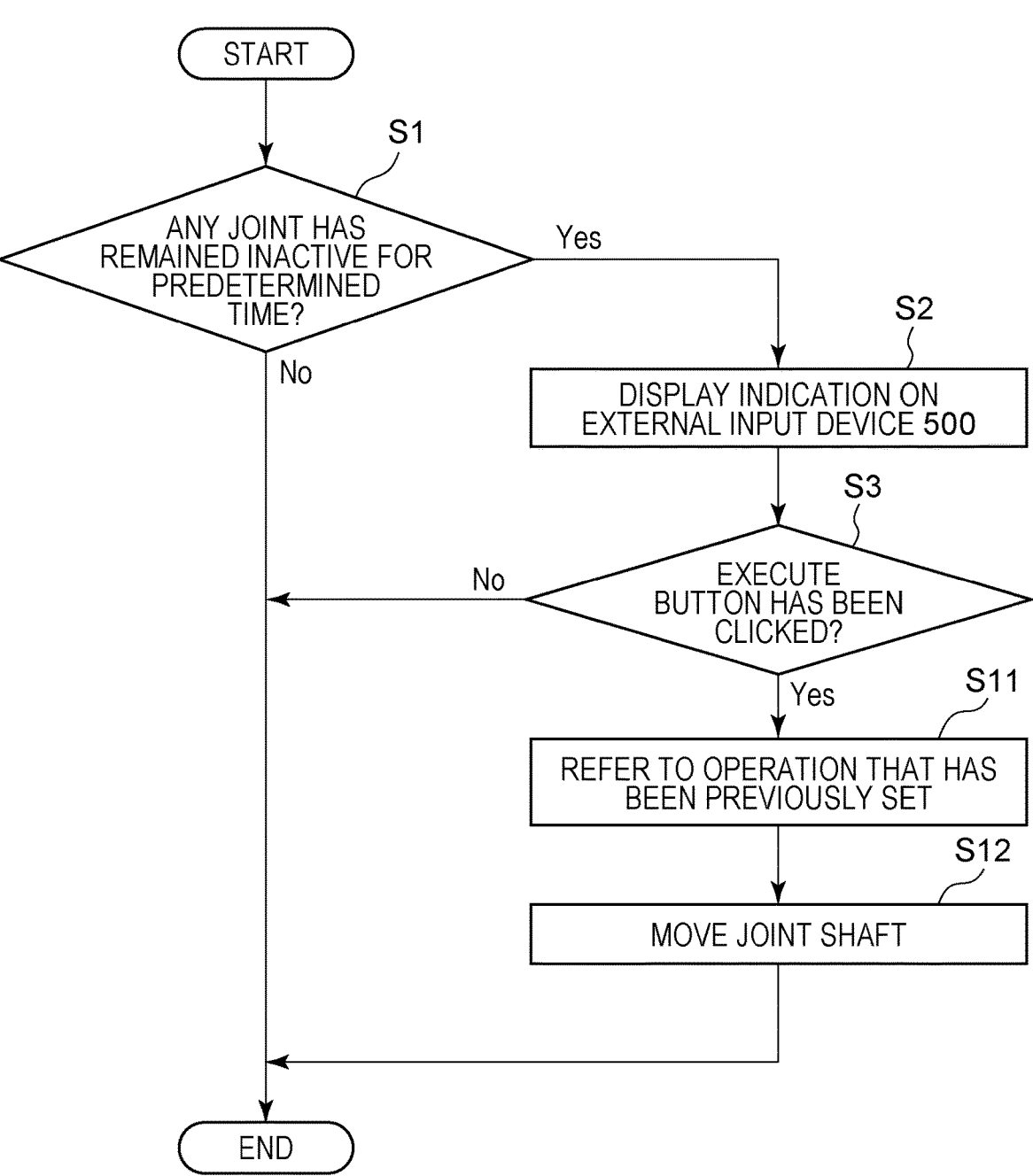
FIG. 4 is a flowchart according to an embodiment.

FIG. 4 is a flowchart of a control flow according to the present embodiment. The control flow in the present embodiment is implemented by the CPU 401 included in the control device 400. According to FIG. 4, firstly in step S1, a check operation is performed to determine whether any joint has been not driven (inactive) for a predetermined time. This inactive joint can be referred to as a particular joint when necessary. To perform the check operation for determining whether any joint has not been driven for a predetermined time, for example, a log data server for managing drive information about the robot system 100 or a programmable logic controller (PLC) for managing operation information about the entire production line may be used. In the present embodiment, the HDD 404 is able to store log data for managing drive information about the robot system 100, and the log data server can be referred to by the CPU 401. To measure a driving time of each joint of the robot arm body 200, timers may be provided for the individual joints; information from the timers may be stored in the HDD 404 and referred to by the CPU 401.

A predetermined time is, for example, a period of one week or longer. In production lines, maintenance is carried out usually once a week or longer while the production lines are stopped. When the present embodiment is implemented while the production lines are stopped, the influence on production plans is minimized, whereas the effect of the present embodiment is enhanced. For this reason, the predetermined time is set to one week or longer. Another reason why the predetermined time is set to one week or longer is that long holidays such as the New Year holiday and summer holiday are often set to about a week. Although the predetermined time is set to about one week in the present embodiment, in some production lines in which robots are stopped everyday, the present embodiment may be implemented first thing in the morning when robots are turned on.

Figure 5:
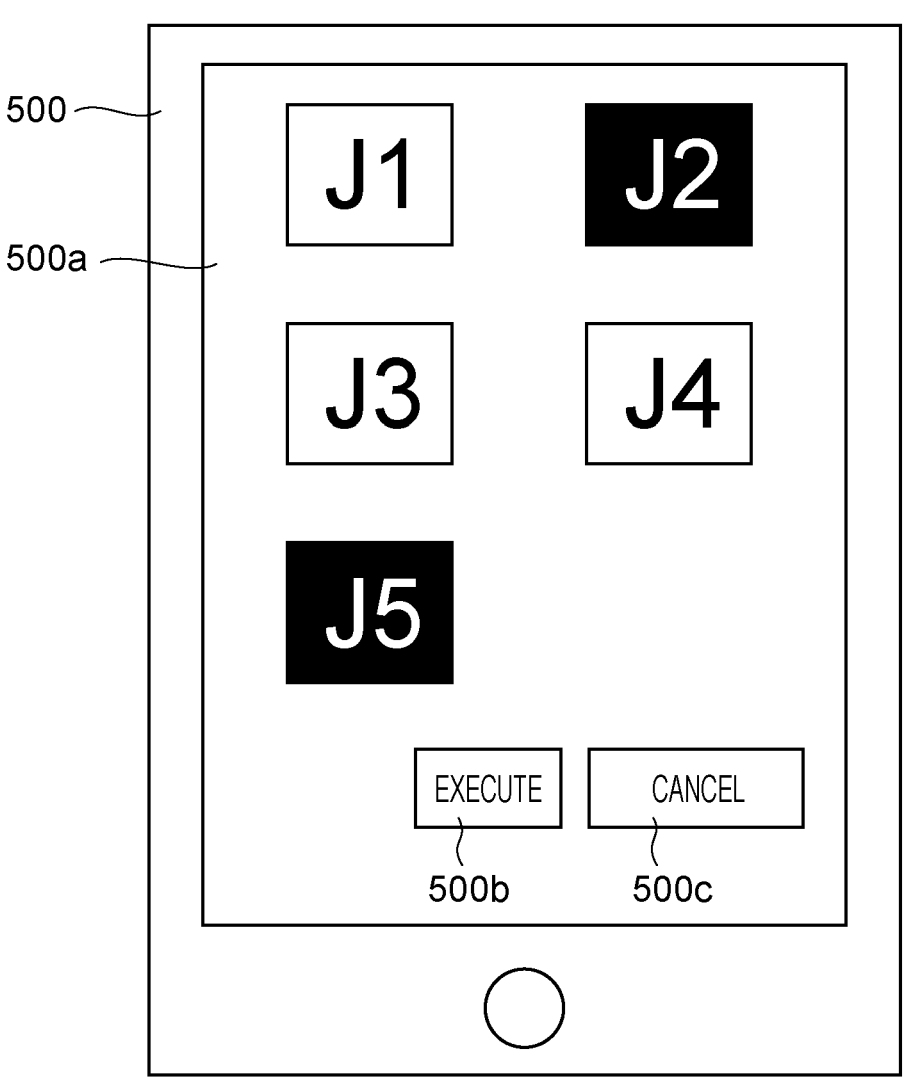
FIG. 5 illustrates an indication.

When it is determined that any joint has not been driven for the predetermined time in step S1, the flow proceeds to step S2. In step S2, an indication that any joint has not been driven for the predetermined time is displayed on the external input device 500. FIG. 5 illustrates an example of the indication on the external input device 500 in step S2 of the present embodiment. The external input device 500 includes a touch-panel display (a display unit) 500a. The display 500a is operable to display various items. When no joint has been inactive for the predetermined time, the control flow ends.

In FIG. 5, boxes representing the joints J1 to J5 are displayed on the display 500a. The boxes of the joints that have not been driven for the predetermined time are highlighted in black. In the example in FIG. 5, the case in which the joints J2 and J5 have not been driven for the predetermined time is displayed. On the display 500a, an execute button 500b and a cancel button 500c are displayed. In step S2, as well as an indication that any joint has not been driven for the predetermined time, the execute button 500b, which is usable to execute the control flow described below, and the cancel button 500c, which is usable to cancel execution, are displayed as user interfaces. When the execute button 500b is pressed, the control flow described below is executed. The execute button 500b and the cancel button 500c are displayed on the present embodiment in the external input device 500, but the execute button 500b and the cancel button 500c may be displayed on the monitor 511.

The flow subsequently proceeds to step S3. In step S3, it is determined whether the user has clicked (pressed) the execute button. When the execute button has been clicked (Yes in step S3), the flow proceeds to step S11. When the cancel button has been clicked (No in step S3), the control flow ends. As described above, the user executes the control flow by clicking the button displayed on the external input device 500 or the monitor 511. In another method, a physical switch may be provided at the external input device 500 or the monitor 511 and used to execute the control flow.

In step S11, to perform maintenance, a maintenance operation within the range of operations that have been previously set as production operations is referred to. In the maintenance operation, each joint is moved within a predetermined range. Examples of the maintenance operations include an operation of rotating the joint J1 by 180° and an operation of lifting or lowering the joint J2 by 45°. To set production operations in the robot system, usually, after the relationships between the robot arm body 200 and the robot hand body 300 and surrounding objects are identified, simulations are carried out, or operations are actually performed on-site. For example, the positional relationships between the robot arm and the robot hand, and surrounding objects (for example, poles, the ceiling, and part trays that are provided in the production line) are inputted in a course generation simulator, and optimum operational courses for the robot arm or the robot hand are configured. Optimum operational courses are typically designed to allow the robot arm body 200 and the robot hand body 300 to perform operations in short times without interfering with surrounding objects, in the state in which the robot arm body 200 and the robot hand body 300 do not bear excessive loads. Instead of using such a simulator, operations can be actually performed on-site and determine optimum operational courses through trial and error.

In the present embodiment, together with such production operations, a maintenance operation to be used in step S11 is set within the range of production operations. In this case, a given range of production operations are set as the maintenance operation, but this should not be interpreted as limiting. For example, in particular kinds of production operations, particular joints can be unused (not driven). For this reason, maintenance operations without interference between the robot arm and the robot hand, and surrounding objects may be set for the individual joints through simulations or by actually performing operations on-site. An example of the maintenance operations is that, to perform maintenance for the joint J1 of the robot arm body 200, the robot arm body 200 is brought into a position that allows the joint J1 to not interfere with surrounding objects when the joint J1 moves across a predetermined range; and while the robot arm body 200 is maintained in the position, the joint J1 moves across the predetermined range. Similar operations may be set for the other joints J2 to J5 to enhance effectiveness. To bring the robot arm body 200 into these positions, firstly, the robot arm body 200 is brought into a standard position that allows the robot arm body 200 to not interfere with surrounding objects, and then the robot arm body 200 is brought into any of these positions. This method further reduces the likelihood of interference with surrounding objects.

No particular limitation is provided on the operating speed in the operation referred to in step S11. However, to spread grease more effectively, it is desirable that the operation be performed at an operating speed lower than the normal production operations. To apply grease to, for example, the speed reducer, it is desirable that under the condition in which the output rotation angle is as large as possible, the operation be performed at a speed of 1000 to 3000 rotations per minute for 20 minutes or longer. To minimize the influence if the robot arm or robot hand accidentally interferes with surrounding objects, the corresponding joint may initially be moved at a speed that can cause minimal influence; once no interference is confirmed at this speed, the speed for moving the joint may be gradually increased. In addition to minimizing the influence of interference, this configuration can be expected to reduce the time required to perform the maintenance operation to some extent.

In step S12, the operation referred to in step S11 is performed with the robot arm body 200, so that a maintenance operation is performed with the robot arm body 200. In the present embodiment, to minimize the likelihood of interference during the maintenance operation, when multiple joints have remained inactive for the predetermined time, the joints are moved one by one in maintenance operations. However, when performing a maintenance operation with multiple joints results in almost no influence due to the locations of surrounding objects, multiple joints may be moved.

It has been previously confirmed that during the operation referred to in step S11, the robot arm body 200 and the robot hand body 300 do not interfere with surrounding objects. As such, the likelihood of occurrence of interference during the maintenance operation is minimized, and as a result, the user can execute the maintenance operation without concern. After the operation in step S12 is completed, the control flow ends. As a result of this control flow, grease can be spread over the constituent parts (the speed reducer, the crossed roller bearing (CRB), the bearing, and the oil seal) of the joint that has not been driven for the predetermined time, or the tension of the belt of the joint can be regulated.

As described above, in the present embodiment, when any joint has not been driven for the predetermined time, the user can execute the maintenance operation in the state in which no interference with surrounding objects occurs or, if interference occurs, the influence of the interference on the robot arm, the robot hand, and surrounding objects is minimized.

Customarily, robot systems have often been reused in the same production lines in which the robot systems had previously been used for a long time, following a certain period of suspension of the production lines. This suspension is conducted after specific production plans have been achieved, in response to demands for a variety of products. During such suspension, the production lines and robot systems are out of operation, so that all the joints of the robot arm consequently remain inactive. In another example, after robot systems had been used in particular production lines for a long period and the use of the robot systems for the particular purposes was terminated, the robot systems have often been reused for other purposes. For example, in recent years, robot arms have often been reused in production lines different from the previous production lines in which the robot arms were used, after being kept idle for a certain period. The operations and movements performed by the robot arms differ before and after this reuse. For example, after a robot arm has been used in an operation with simple movements, such as an pick-and-place operation in which only some of the joints of the robot arm move, in the subsequent production line, all of the joints can be moved. Similar situations can occur when production lines are temporarily suspended for long holidays, such as the New Year holiday and summer holiday.

In these cases, grease can seep out, become uneven, or vaporize at the speed reducer, the CRB, the bearing, and the oil seal in joints that have not been driven for a certain period. Additionally, a consistent degree of tension can be maintained on the belt. However, in the present embodiment, operations that do not cause interference or that can minimize the influence of interference are set in advance as maintenance operations, and as a result, the user can execute the maintenance operations without concern.

Overall, it is possible to eliminate or minimize the influence of interference between the robot and surrounding objects when a maintenance operation is performed because a joint of the robot has not been driven for a certain period (the predetermined time). By eliminating or minimizing the influence of interference, users are encouraged to execute maintenance operations. It should be noted that in step S2, a notification "the operation to be performed is designed with consideration of interference influence" may be displayed for the user. This configuration can further reduce the user's psychological barriers to executing maintenance operations.

Second Embodiment

The following describes a second embodiment of the present disclosure in detail. In the present embodiment, the use of an imaging device to perform a maintenance operation that can minimize the likelihood of interference between the robot arm or robot hand and surrounding objects will be specifically described. In the following, basic features of the hardware configuration and display screen configuration are the same as the embodiment described above, and the detailed descriptions thereof will not be repeated. In the embodiment described below, the same reference numerals denote the same or substantially the same members, and the detailed descriptions thereof will not be repeated.

Figure 6:
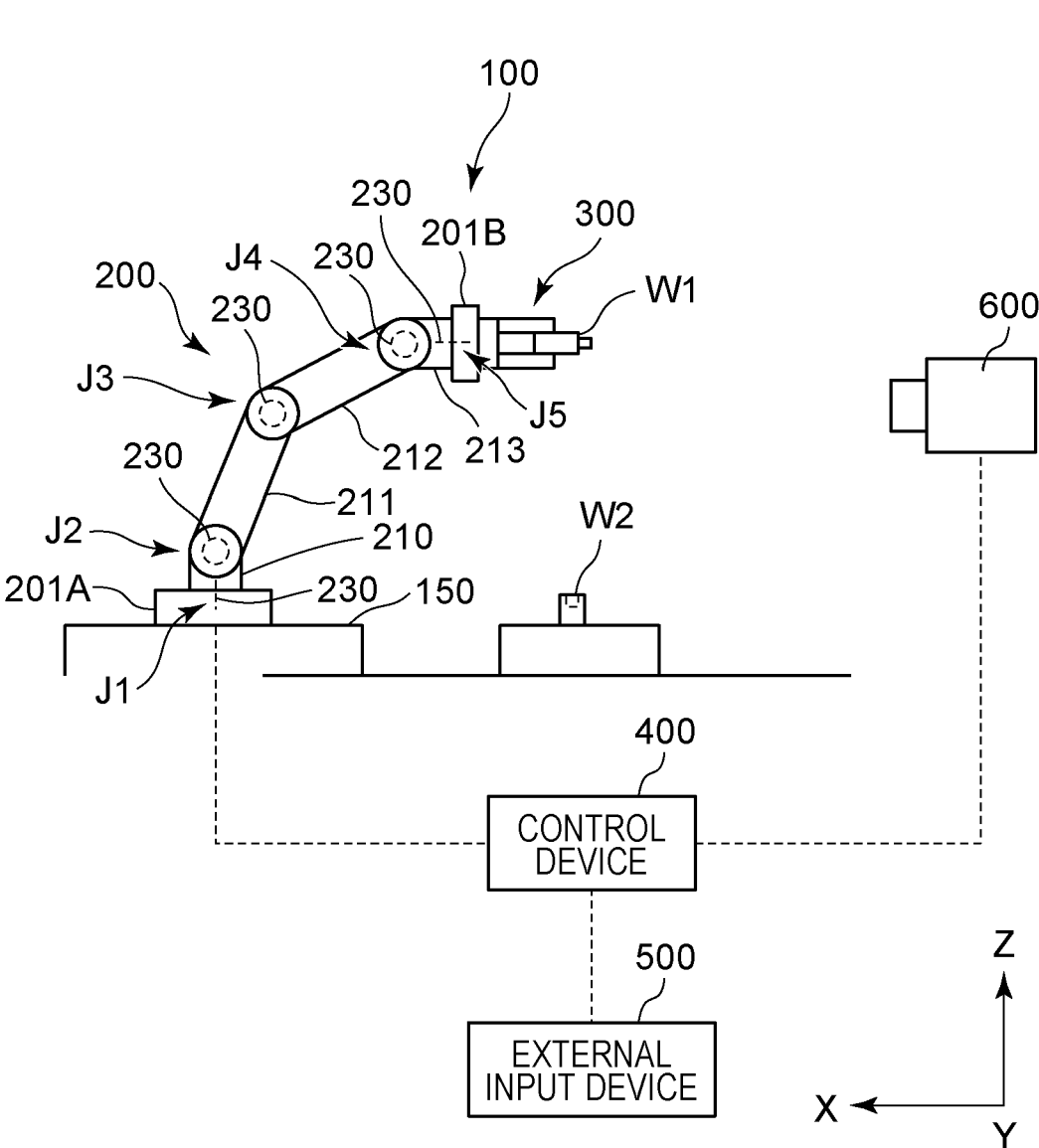
FIG. 6 is a schematic diagram of a robot system according to an embodiment.

FIG. 6 is a schematic diagram of the robot system 100 according to the present embodiment. In the present embodiment, an imaging device 600 is provided at a location that enables the imaging device 600 to detect (obtain) the positional relationships among the robot arm body 200, the robot hand body 300, and surrounding objects. The information from the imaging device 600 can be transmitted to the control device 400.

Figure 7:
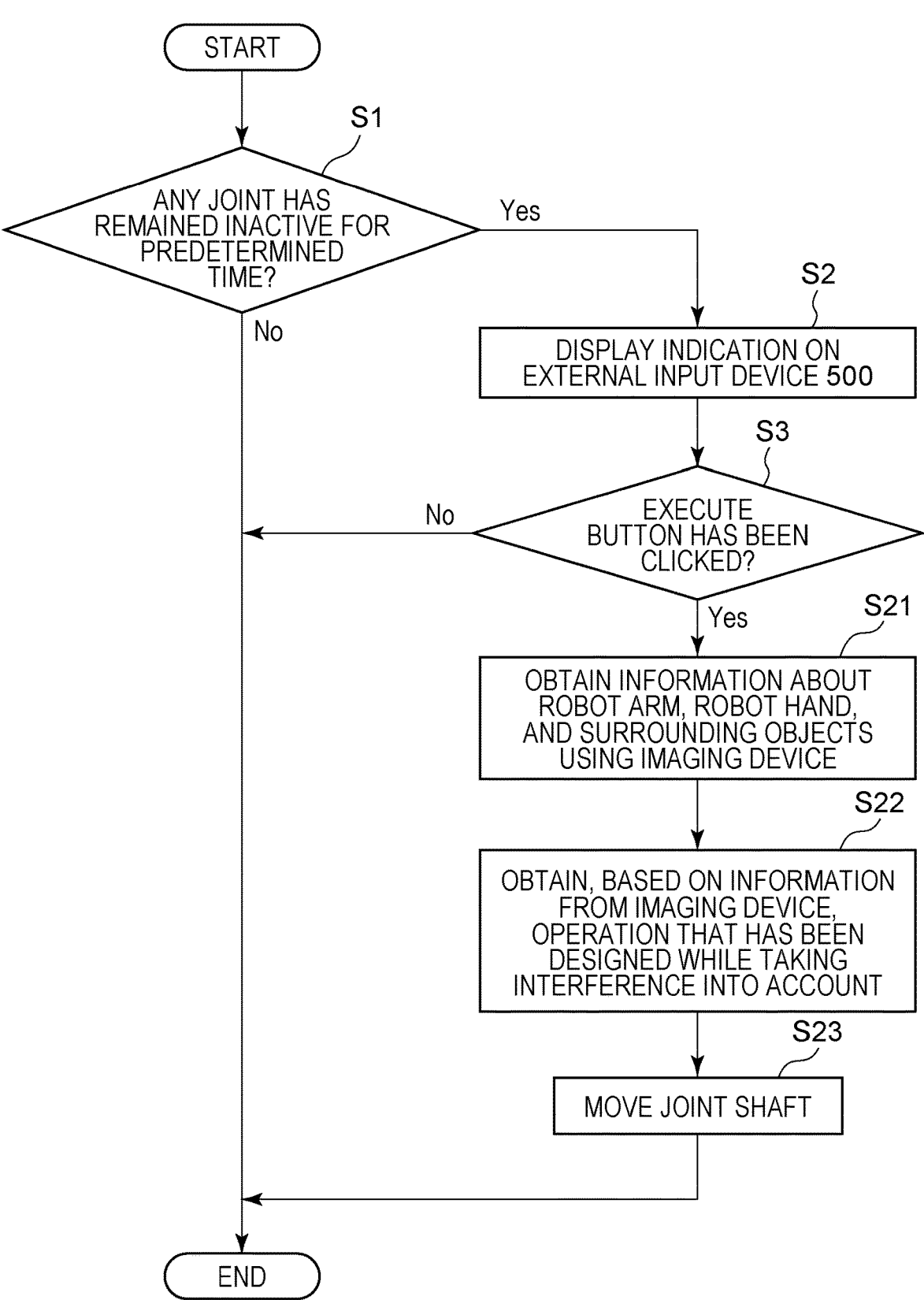
FIG. 7 is a flowchart according to an embodiment.

FIG. 7 is a flowchart of a control flow according to the present embodiment. The control flow in the present embodiment is implemented by the CPU 401 included in the control device 400. According to FIG. 7, firstly in step S1, a check operation is performed to determine whether any joint has been not driven (inactive) for a predetermined time.

When it is determined that any joint has not been driven for the predetermined time in step S1, the flow proceeds to step S2. In step S2, an indication that any joint has not been driven for the predetermined time is displayed on the external input device 500. The indication displayed is the same as in FIG. 5. When no joint has been inactive for the predetermined time, the control flow ends.

The flow subsequently proceeds to step S3. In step S3, it is determined whether the user has clicked (pressed) the execute button. When the execute button has been clicked (Yes in step S3), the flow proceeds to step S21. When the cancel button has been clicked (No in step S3), the control flow ends. As described above, the user executes the control flow by clicking the button displayed on the external input device 500 or the monitor 511.

In step S21, when any joint shaft has not been driven for the predetermined time, information of the location of the robot arm body 200, information of the location of the robot hand body 300, and information of the locations of surrounding objects are obtained using an imaging device. As the imaging device, for example, a camera may be used, but a two-dimensional camera, three-dimensional camera, smartphone camera, or network camera may be used as appropriate. Usually, the camera is provided on the ceiling or a wall of the production line. However, this should not be interpreted as limiting, and the camera may be provided at any location that allows the camera to obtain information of the location of the robot arm body 200, information of the location of the robot hand body 300, and information of the location of surrounding objects.

Next, in step S22, a maintenance operation of the robot arm body 200 that can avoid interference between the robot arm body 200 or the robot hand body 300 and surrounding objects or that can minimize the effect of the interference is obtained (generated). In the maintenance operation, each joint is moved within a predetermined range. Examples of the maintenance operations include an operation of rotating the joint J1 by 180° and an operation of lifting or lowering the joint J2 by 45°. Based on the positional relationships obtained using the imaging device in step S21, a course of the robot arm body 200 and the robot hand body 300 that avoids interference is obtained. A known technology may be used as the technology for avoiding interference between the robot arm and the robot hand, and surrounding objects using the imaging device. Examples of the known technology include International Publication No. WO2016/189896 and Japanese Patent Laid-Open No. 2020-28957.

In another example, the control device 400 may be provided with a simulator. The simulator is usable to store information about the robot arm body 200, the robot hand body 300, and surrounding objects. Based on information from the imaging device 600, the present location of the robot arm body 200 and the present location of the robot hand body 300 may be identified. The simulator may perform a simulation for operations that avoid interference to obtain a course that avoids interference between the robot arm and the robot hand, and surrounding objects. An example of the technology for avoiding interference through simulation is International Publication No. WO2016/103297.

When interference is not avoidable, an operation that avoids excessive loads when the robot arm body 200 or the robot hand body 300 interferes with surrounding objects is obtained. An example of such an operation is that the robot arm body 200 or the robot hand body 300 moves along surrounding objects. The operation along surrounding objects is performed based on the location information obtained by the imaging device 600 about the robot arm body 200, the robot hand body 300, and surrounding objects.

Alternatively, the information from the simulator and the imaging device 600 about the present location of the robot arm body 200 and the present location of the robot hand body 300 may be used. For example, as described in Japanese Patent Laid-Open No. 2021-82222, a path is extended from the present location of the robot hand body 300 while the robot hand body 300 remains in contact with surrounding objects, and a course corresponding to the path is obtained as the course for the robot arm body 200. Using this course, the operation in which the robot arm body 200 or the robot hand body 300 moves along surrounding objects can be performed.

No particular limitation is provided on the operating speed in the operation obtained in step S22. However, to spread grease more effectively, it is desirable that the operation be performed at an operating speed lower than the normal production operations. To minimize the influence if the robot arm or robot hand accidentally interferes with surrounding objects, the corresponding joint may initially be moved at a speed that can cause minimal influence; once no interference is confirmed at this speed, the speed for moving the joint may be gradually increased. In addition to minimizing the influence of interference, this configuration can be expected to reduce the time required to perform the maintenance operation to some extent.

In step S23, the operation obtained in step S22 is performed with the robot arm body 200, so that a maintenance operation is performed with the robot arm body 200. In the present embodiment, to minimize the likelihood of interference during the maintenance operation, when multiple joints have remained inactive for the predetermined time, the joints are moved one by one in maintenance operations. However, when performing a maintenance operation with multiple joints results in almost no influence due to the locations of surrounding objects, multiple joints may be moved.

It has been previously confirmed that during the operation obtained in step S22, the robot arm body 200 and the robot hand body 300 do not interfere with surrounding objects, or the influence of interference is minimized. As such, the likelihood and influence of occurrence of interference during the maintenance operation is minimized, and as a result, the user can execute the maintenance operation without concern. After the operation in step S12 is completed, the control flow ends. As a result of this control flow, grease can be spread over the constituent parts (the speed reducer, the crossed roller bearing (CRB), the bearing, and the oil seal) of the joint that has not been driven for the predetermined time, or the tension of the belt of the joint can be regulated.

As described above, in the present embodiment, when any joint has not been driven for the predetermined time, the user can execute the maintenance operation in the state in which no interference with surrounding objects occurs or, if interference occurs, the influence of the interference on the robot arm, the robot hand, and surrounding objects is minimized. It is possible to eliminate or minimize the influence of interference between the robot and surrounding objects when a maintenance operation is performed because a joint of the robot has not been driven for a certain period (the predetermined time). By eliminating or minimizing the influence of interference, users are encouraged to execute maintenance operations. The embodiment and modifications described above may be combined with the present embodiment and modifications.

Third Embodiment

The following describes a third embodiment of the present disclosure in detail. In the present embodiment, the use of torque sensors to perform a maintenance operation that can minimize the influence of interference between the robot arm or robot hand and surrounding objects will be specifically described. In the following, basic features of the hardware configuration and display screen configuration are the same as the embodiment described above, and the detailed descriptions thereof will not be repeated. In the embodiment described below, the same reference numerals denote the same or substantially the same members, and the detailed descriptions thereof will not be repeated. In the present embodiment, torque sensors are used as an example in the description. However, this should not be interpreted as limiting, and any device capable of detecting external forces acting on the robot arm body 200 and the robot hand body 300 may be used. For example, a current sensor capable of obtaining (detecting) the drive current of the motor or a temperature sensor capable of obtaining (detecting) changes in temperature due to contact with surrounding objects may be used. Such a sensor for obtaining information about forces acting on the robot is referred to as a first sensor when necessary.

Figure 8:
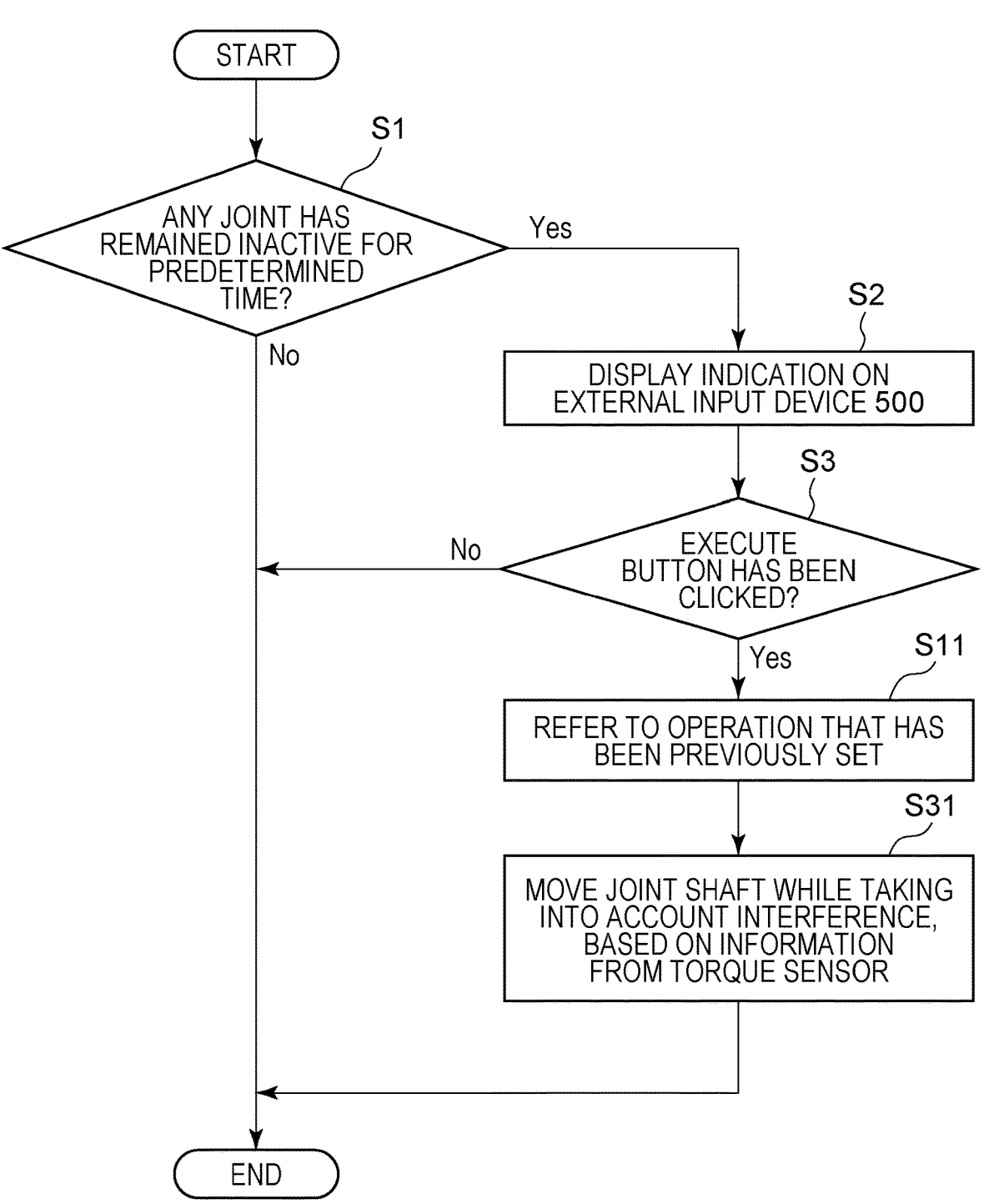
FIG. 8 is a flowchart according to an embodiment.

FIG. 8 is a flowchart of a control flow according to the present embodiment. The control flow in the present embodiment is implemented by the CPU 401 included in the control device 400. According to FIG. 8, firstly in step S1, a check operation is performed to determine whether any joint has been not driven (inactive) for a predetermined time.

When it is determined that any joint has not been driven for the predetermined time in step S1, the flow proceeds to step S2. In step S2, an indication that any joint has not been driven for the predetermined time is displayed on the external input device 500. The indication displayed is the same as in FIG. 5. When no joint has been inactive for the predetermined time, the control flow ends.

The flow subsequently proceeds to step S3. In step S3, it is determined whether the user has clicked (pressed) the execute button. When the execute button has been clicked (Yes in step S3), the flow proceeds to step S11. When the cancel button has been clicked (No in step S3), the control flow ends. As described above, the user executes the control flow by clicking the button displayed on the external input device 500 or the monitor 511.

In step S11, to perform maintenance, a maintenance operation within the range of operations that have been previously set as production operations is referred to. In the maintenance operation, each joint is moved within a predetermined range. Examples of the maintenance operations include an operation of rotating the joint J1 by 180° and an operation of lifting or lowering the joint J2 by 45°. Similarly to the first embodiment, a predetermined range of production operations that have been set as maintenance operations may be referred to, or other maintenance operations that have been set for the individual joints may be referred to.

In step S31, based on the information from the torque sensors of the robot arm body 200, the maintenance operation referred to in step S11 is performed in the manner that prevents excessive loads on the robot arm body 200 and the robot hand body 300. In the present embodiment, to minimize the likelihood of interference during the maintenance operation, when multiple joints have remained inactive for the predetermined time, the joints are moved one by one in maintenance operations. However, when performing a maintenance operation with multiple joints results in almost no influence due to the locations of surrounding objects, multiple joints may be moved.

To perform such an operation, the robot arm body 200 and the robot hand body 300 are controlled to move along surrounding objects in the manner that prevents the force applied to the robot arm body 200 and the robot hand body 300 from reaching a predetermined level or higher, based on the information from the torque sensors.

A known technology may be used to control the robot along surrounding objects based on information about force as described above. Examples of the known technology include Japanese Patent Laid-Open No. 2018-199172 and Japanese Patent Laid-Open No. 07-319547. As described above, in the state in which the portions of the robot arm body 200 and the robot hand body 300 are moved along surrounding objects, and the position of the robot arm body 200 is changed, the maintenance operation is performed with the joint that has remained inactive for the predetermined time.

No particular limitation is provided on the operating speed in the operation performed in step S31. However, to spread grease more effectively, it is desirable that the operation be performed at an operating speed lower than the normal production operations. The operation performed in step S31 minimizes the influence of interference between the robot arm body 200 or the robot hand body 300 and surrounding objects. As such, the influence of interference during the maintenance operation is minimized, and as a result, the user can execute the maintenance operation without concern. After the operation in step S31 is completed, the control flow ends. As a result of this control flow, grease can be spread over the constituent parts (the speed reducer, the crossed roller bearing (CRB), the bearing, and the oil seal) of the joint that has not been driven for the predetermined time, or the tension of the belt of the joint can be regulated.

As described above, in the present embodiment, when any joint has not been driven for the predetermined time, the user can execute the maintenance operation in the state in which no interference with surrounding objects occurs or, if interference occurs, the influence of the interference on the robot arm, the robot hand, and surrounding objects is minimized. By using the torque sensor, the maintenance operation can be performed based on the latest condition of the robot system 100. Thus, when surrounding objects have been changed since the robot system 100 started, the maintenance operation that minimizes the influence of interference can be performed. It is possible to eliminate or minimize the influence of interference between the robot and surrounding objects when a maintenance operation is performed because a joint of the robot has not been driven for a certain period (the predetermined time). By eliminating or minimizing the influence of interference, users are encouraged to execute maintenance operations. The embodiment and modifications described above may be combined with the present embodiment and modifications.

Fourth Embodiment

The following describes a fourth embodiment of the present disclosure in detail. In the present embodiment, the use of pressure-sensitive sensors or contact detection sensors provided at the surfaces of the robot arm body 200 and the robot hand body 300 to perform a maintenance operation that can minimize the influence of interference between the robot arm or robot hand and surrounding objects will be specifically described. The pressure-sensitive sensors or contact detection sensors are provided at the individual links of the robot arm body 200 and the robot hand body 300, so that the pressure-sensitive sensors or contact detection sensors are able to detect contact of the links and the robot hand body 300 with surrounding objects. A sensor for detecting contact of the robot, such as the pressure-sensitive sensor or contact detection sensor, is referred to as a second sensor when necessary. In the following, basic features of the hardware configuration and display screen configuration are the same as the embodiment described above, and the detailed descriptions thereof will not be repeated.

In the embodiment described below, the same reference numerals denote the same or substantially the same members, and the detailed descriptions thereof will not be repeated.

Figure 9:
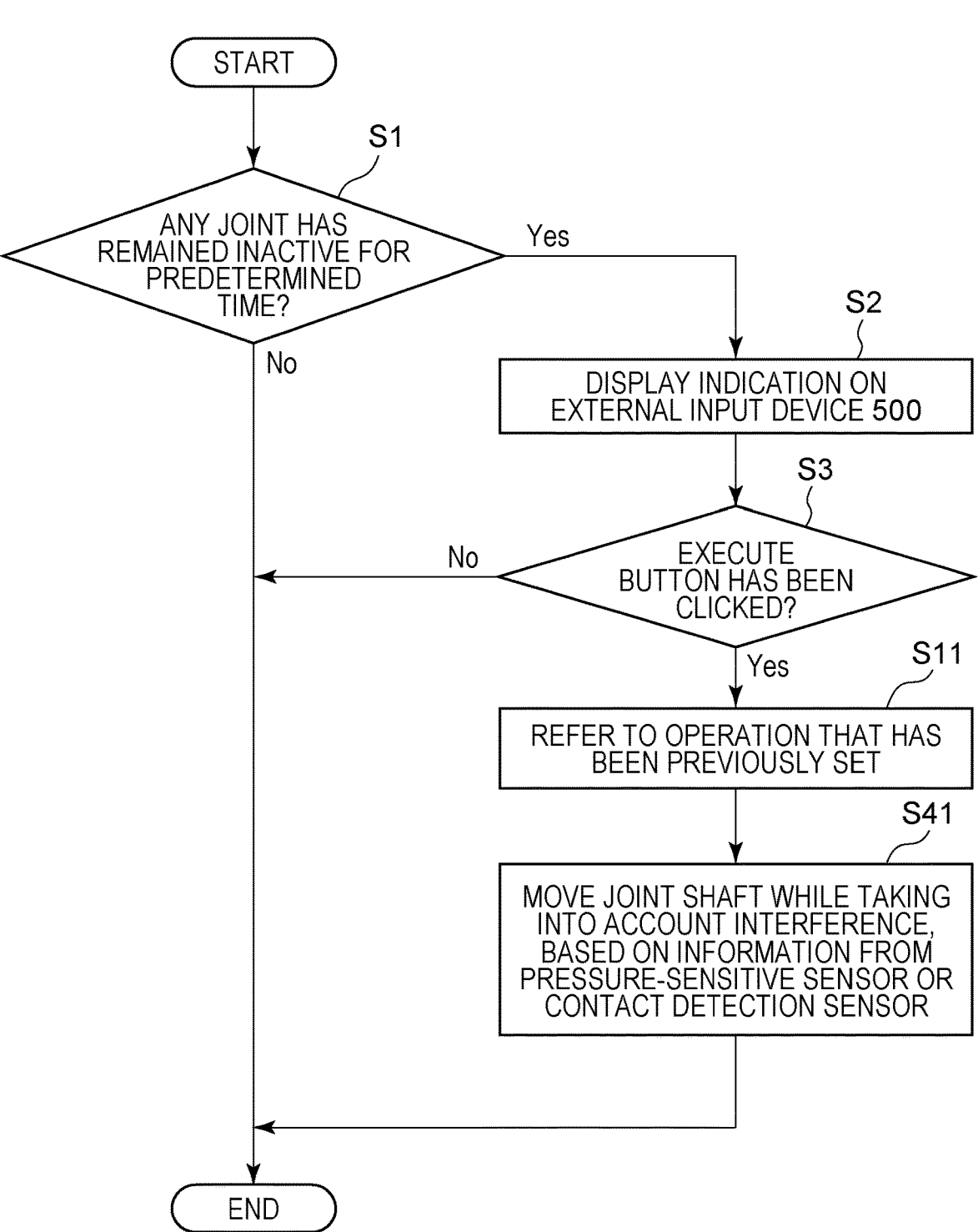
FIG. 9 is a flowchart according to an embodiment.

FIG. 9 is a flowchart of a control flow according to the present embodiment. The control flow in the present embodiment is implemented by the CPU 401 included in the control device 400. According to FIG. 9, firstly in step S1, a check operation is performed to determine whether any joint has been not driven (inactive) for a predetermined time.

When it is determined that any joint has not been driven for the predetermined time in step S1, the flow proceeds to step S2. In step S2, an indication that any joint has not been driven for the predetermined time is displayed on the external input device 500. The indication displayed is the same as in FIG. 5. When no joint has been inactive for the predetermined time, the control flow ends.

The flow subsequently proceeds to step S3. In step S3, it is determined whether the user has clicked (pressed) the execute button. When the execute button has been clicked (Yes in step S3), the flow proceeds to step S11. When the cancel button has been clicked (No in step S3), the control flow ends. As described above, the user executes the control flow by clicking the button displayed on the external input device 500 or the monitor 511.

In step S11, to perform maintenance, a maintenance operation within the range of operations that have been previously set as production operations is referred to. In the maintenance operation, each joint is moved within a predetermined range. Examples of the maintenance operations include an operation of rotating the joint J1 by 180° and an operation of lifting or lowering the joint J2 by 45°. Similarly to the first embodiment, a predetermined range of production operations that have been set as maintenance operations may be referred to, or other maintenance operations that have been set for the individual joints may be referred to. In the present embodiment, the joints that have remained inactive for the predetermined time are moved one by one.

In step S41, based on the information from the pressure-sensitive sensors or contact detection sensors of the robot arm body 200, the maintenance operation referred to in step S11 is performed in the manner that prevents excessive loads on the robot arm body 200 and the robot hand body 300.

For example, the robot arm body 200 and the robot hand body 300 are moved at a low speed that causes minimal influence when the robot arm body 200 and the robot hand body 300 come into contact with surrounding objects. When a pressure-sensitive sensor or contact detection sensor outputs a signal, the robot arm body 200 and the robot hand body 300 are stopped. Subsequently, the link or the robot hand body 300 provided with the pressure-sensitive sensor or contact detection sensor having outputted the signal is moved in a different direction to the direction in which the link or the robot hand body 300 was moving until the signal was outputted. In the present embodiment, the link or the robot hand body 300 is moved in the opposite direction to change the position of the robot arm body 200. Subsequently, the joint that has remained inactive for the predetermined time is moved again in the same direction when the movement started. As described above, firstly, the joint that has remained inactive for the predetermined time is moved. When contact with surrounding objects is detected, the position of the robot arm body 200 or the position of the robot hand body 300 is changed. Subsequently, the joint that has remained inactive for the predetermined time is moved again. In this manner, the maintenance operation that minimizes the influence of interference is performed.

To spread grease more effectively, it is desirable that the operation performed in step S41 be performed at an operating speed lower than the normal production operations. The operation performed in step S41 minimizes the influence of interference between the robot arm body 200 or the robot hand body 300 and surrounding objects. As such, the influence of interference during the maintenance operation is minimized, and as a result, the user can execute the maintenance operation without concern. After the operation in step S41 is completed, the control flow ends. As a result of this control flow, grease can be spread over the constituent parts (the speed reducer, the crossed roller bearing (CRB), the bearing, and the oil seal) of the joint that has not been driven for the predetermined time, or the tension of the belt of the joint can be regulated.

As described above, in the present embodiment, when any joint has not been driven for the predetermined time, the user can execute the maintenance operation in the state in which no interference with surrounding objects occurs or, if interference occurs, the influence of the interference on the robot arm, the robot hand, and surrounding objects is minimized. By using the pressure-sensitive sensor or contact detection sensor, the maintenance operation can be performed based on the latest condition of the robot system 100. Thus, when surrounding objects have been changed since the robot system 100 started, the maintenance operation that minimizes the influence of interference can be performed. It is possible to eliminate or minimize the influence of interference between the robot and surrounding objects when a maintenance operation is performed because a joint of the robot has not been driven for a certain period (the predetermined time). By eliminating or minimizing the influence of interference, users are encouraged to execute maintenance operations. The embodiment and modifications described above may be combined with the present embodiment and modifications.

Fifth Embodiment

The following describes a fifth embodiment of the present disclosure in detail. In the present embodiment, the use of distance sensors provided at the surfaces of the robot arm body 200 and the robot hand body 300 to perform a maintenance operation that can minimize the influence of interference between the robot arm or robot hand and surrounding objects will be specifically described. The distance sensors are provided at the individual links of the robot arm body 200 and the robot hand body 300, so that the pressure-sensitive sensors or contact detection sensors are able to detect contact of the links and the robot hand body 300 with surrounding objects. The distance sensor is referred to as a third sensor when necessary.

In the following, basic features of the hardware configuration and display screen configuration are the same as the embodiment described above, and the detailed descriptions thereof will not be repeated. In the embodiment described below, the same reference numerals denote the same or substantially the same members, and the detailed descriptions thereof will not be repeated.

Figure 10:
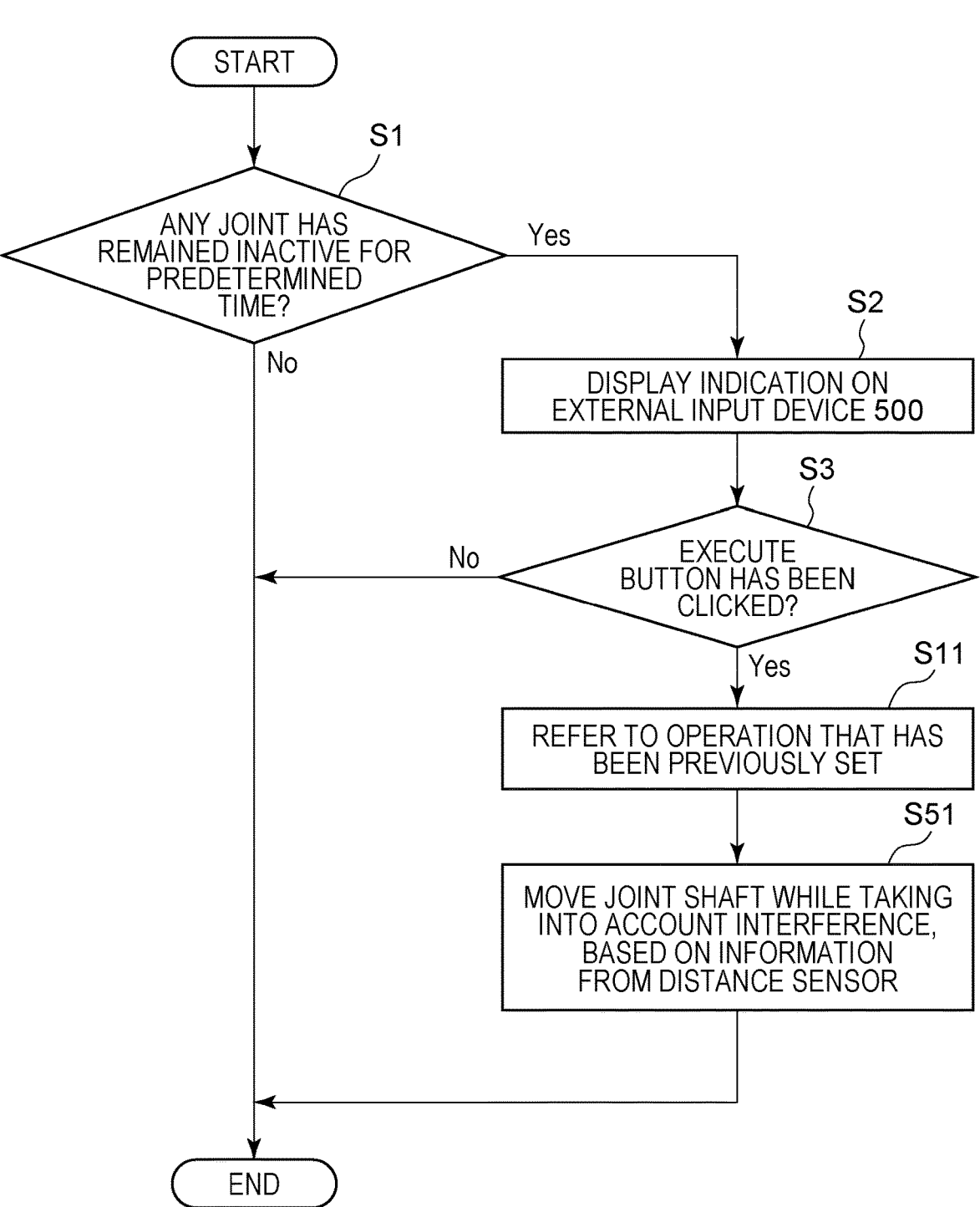
FIG. 10 is a flowchart according to an embodiment.

FIG. 10 is a flowchart of a control flow according to the present embodiment. The control flow in the present embodiment is implemented by the CPU 401 included in the control device 400. According to FIG. 10, firstly in step S1, a check operation is performed to determine whether any joint has been not driven (inactive) for a predetermined time.

When it is determined that any joint has not been driven for the predetermined time in step S1, the flow proceeds to step S2. In step S2, an indication that any joint has not been driven for the predetermined time is displayed on the external input device 500. The indication displayed is the same as in FIG. 5. When no joint has been inactive for the predetermined time, the control flow ends.

The flow subsequently proceeds to step S3. In step S3, it is determined whether the user has clicked (pressed) the execute button. When the execute button has been clicked (Yes in step S3), the flow proceeds to step S11. When the cancel button has been clicked (No in step S3), the control flow ends. As described above, the user executes the control flow by clicking the button displayed on the external input device 500 or the monitor 511.

In step S11, to perform maintenance, a maintenance operation within the range of operations that have been previously set as production operations is referred to. In the maintenance operation, each joint is moved within a predetermined range. Examples of the maintenance operations include an operation of rotating the joint J1 by 180° and an operation of lifting or lowering the joint J2 by 45°. Similarly to the first embodiment, a predetermined range of production operations that have been set as maintenance operations may be referred to, or other maintenance operations that have been set for the individual joints may be referred to.

In step S51, based on the information from the distance sensors of the robot arm body 200 and the robot hand body 300, the maintenance operation is performed in the manner that prevents the robot arm body 200 and the robot hand body 300 from coming into contact with surrounding objects. In the present embodiment, to minimize the likelihood of interference during the maintenance operation, when multiple joints have remained inactive for the predetermined time, the joints are moved one by one in maintenance operations.

To perform such an operation, the robot arm body 200 and the robot hand body 300 are controlled to move in the manner that prevents the robot arm body 200 and the robot hand body 300 from coming into contact with surrounding objects, based on the information from the distance sensors. A known technology may be used for control for preventing interference with surrounding objects using a distance sensor as described above. An example of the known technology is Japanese Patent Laid-Open No. 2018-144136. As described above, in the state in which with respect to the robot arm body 200 and the robot hand body 300, the position of the robot arm body 200 is changed to prevent interference with surrounding objects, the maintenance operation is performed with the joint has remained inactive for the predetermined time.

For example, the robot arm body 200 and the robot hand body 300 are moved at a low speed that causes minimal influence when the robot arm body 200 and the robot hand body 300 come into contact with surrounding objects. When a likelihood of interfere is detected via a signal from a distance sensor, the robot arm body 200 and the robot hand body 300 are stopped. The link or the robot hand body 300 that has the likelihood of interference with surrounding objects is then moved in the opposite direction to the direction in which the link or the robot hand body 300 was moving until the link or the robot hand body 300 was stopped. At this time, using the distance sensor, the link or the robot hand body 300 is prevented from moving in the direction that has the likelihood of interfere. Subsequently, the joint that has remained inactive for the predetermined time is moved again in the same direction when the movement started. As described above, firstly, the joint that has remained inactive for the predetermined time is moved. When a likelihood of interfere is detected, the position of the robot arm body 200 or the position of the robot hand body 300 is changed. Subsequently, the joint that has remained inactive for the predetermined time is moved again. In this manner, the maintenance operation that minimizes the influence of interference is performed.

To spread grease more effectively, it is desirable that the operation performed in step S51 be performed at an operating speed lower than the normal production operations. The operation performed in step S51 minimizes the influence of interference between the robot arm body 200 or the robot hand body 300 and surrounding objects. As such, the influence of interference during the maintenance operation is minimized, and as a result, the user can execute the maintenance operation without concern. After the operation in step S51 is completed, the control flow ends. As a result of this control flow, grease can be spread over the constituent parts (the speed reducer, the crossed roller bearing (CRB), the bearing, and the oil seal) of the joint that has not been driven for the predetermined time, or the tension of the belt of the joint can be regulated.

As described above, in the present embodiment, when any joint has not been driven for the predetermined time, the user can execute the maintenance operation in the state in which no interference with surrounding objects occurs or, if interference occurs, the influence of the interference on the robot arm, the robot hand, and surrounding objects is minimized. By using the distance sensor, the maintenance operation can be performed based on the latest condition of the robot system 100. Thus, when surrounding objects have been changed since the robot system 100 started, the maintenance operation that minimizes the influence of interference can be performed. It is possible to eliminate or minimize the influence of interference between the robot and surrounding objects when a maintenance operation is performed because a joint of the robot has not been driven for a certain period (the predetermined time). By eliminating or minimizing the influence of interference, users are encouraged to execute maintenance operations. The embodiment and modifications described above may be combined with the present embodiment and modifications.

Sixth Embodiment

The following describes a sixth embodiment of the present disclosure in detail. In the present embodiment, maintenance operations are performed using multiple methods, not only a single method, among the first to fifth embodiments. The robot arm body 200 and the robot hand body 300 are provided with the torque sensors, the pressure-sensitive sensors or contact detection sensors, and the distance sensors. In the following, basic features of the hardware configuration and display screen configuration are the same as the embodiment described above, and the detailed descriptions thereof will not be repeated. In the embodiment described below, the same reference numerals denote the same or substantially the same members, and the detailed descriptions thereof will not be repeated.

Figure 11:
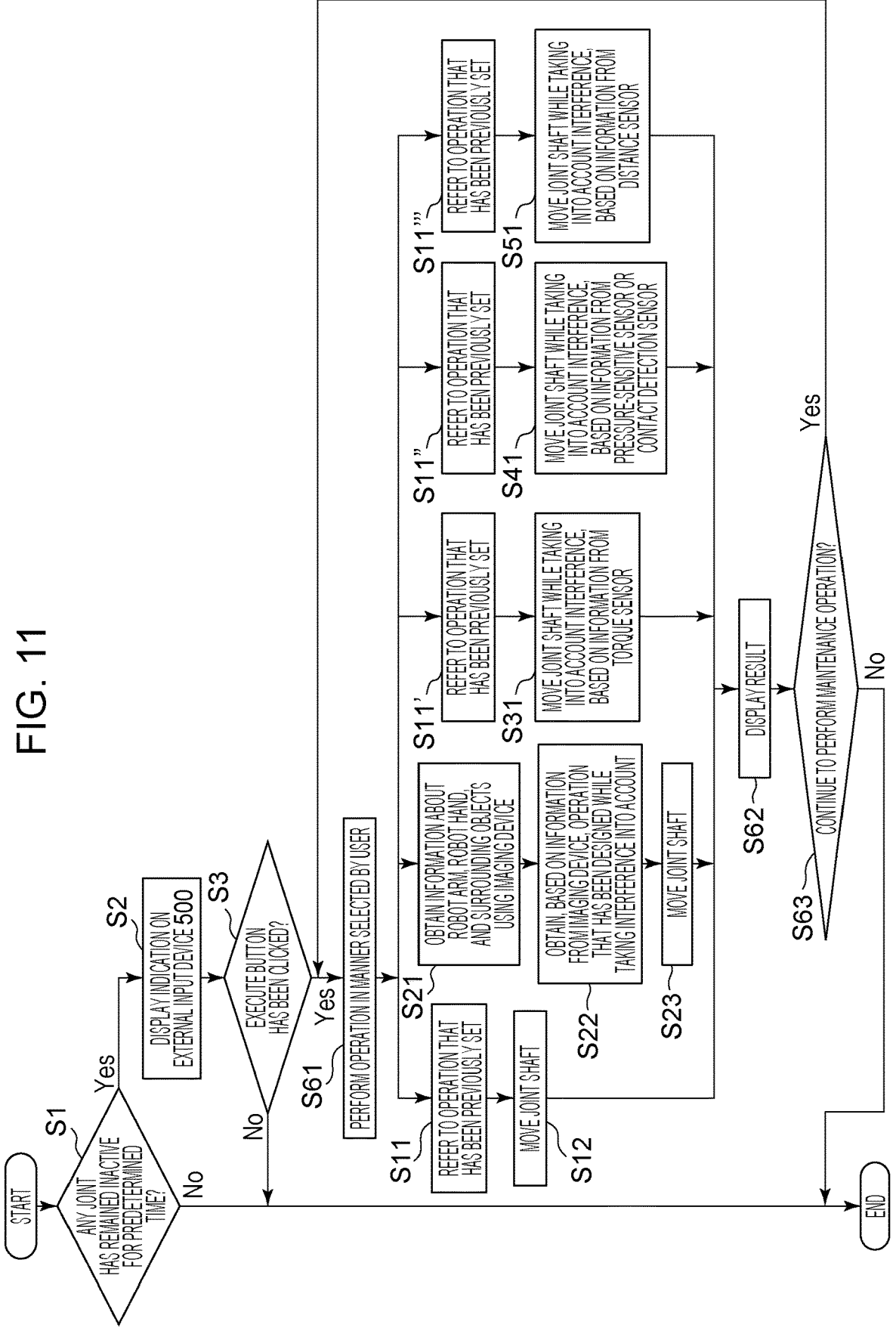
FIG. 11 is a flowchart according to an embodiment.

FIG. 11 is a flowchart of a control flow according to the present embodiment. The control flow in the present embodiment is implemented by the CPU 401 included in the control device 400. According to FIG. 11, firstly in step S1, a check operation is performed to determine whether any joint has been not driven (inactive) for a predetermined time. In the present embodiment, for convenience of description, step S11 is denoted with apostrophes (').

Figure 12:
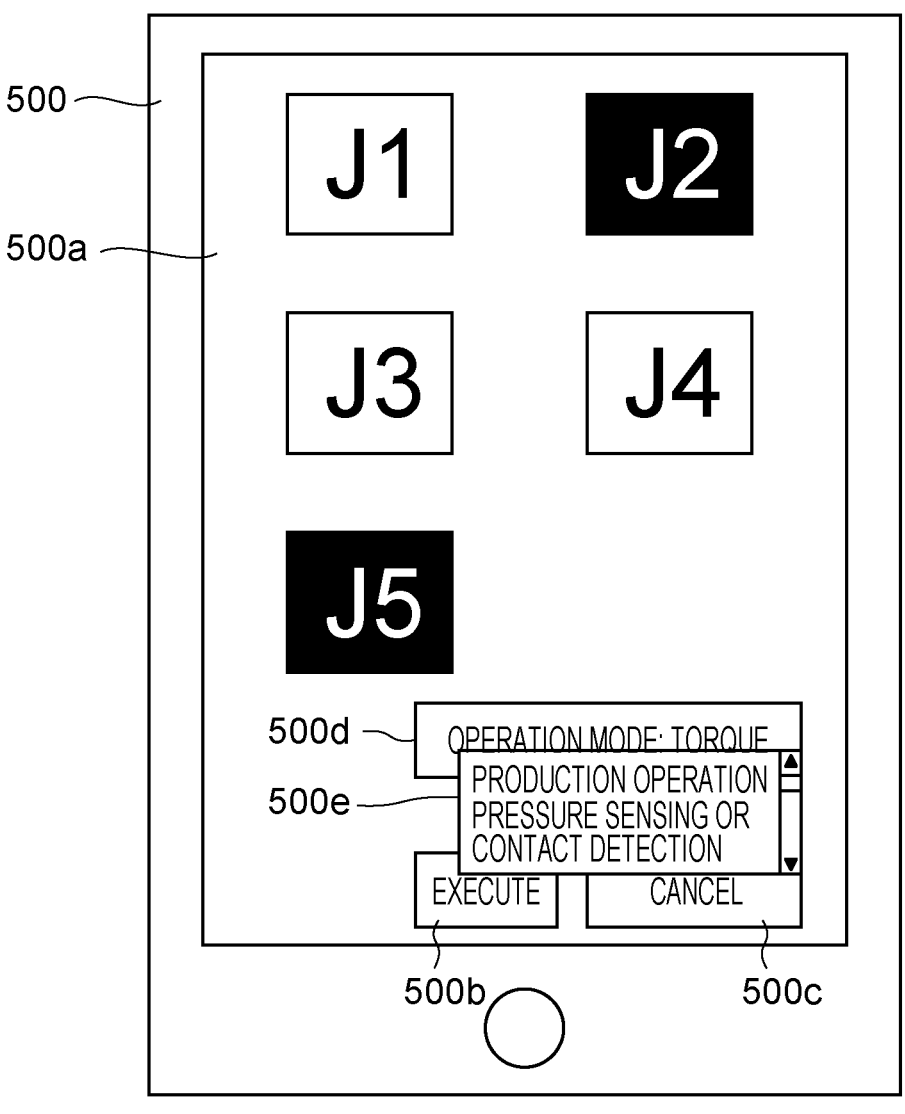
FIG. 12 illustrates an indication.

When it is determined that any joint has not been driven for the predetermined time in step S1, the flow proceeds to step S2. In step S2, an indication that any joint has not been driven for the predetermined time is displayed on the external input device 500. When no joint has been inactive for the predetermined time, the control flow ends. FIG. 12 illustrates an indication displayed in step S2 of the present embodiment. In the present embodiment, an operation mode setting box 500*d* and a pull-down menu 500*e* are displayed. The operation mode setting box 500*d* is usable to configure a setting regarding execution modes for the maintenance operations that minimize the influence of interference, described in the above embodiments. In the example in FIG. 12, "TORQUE" mode is set. The pull-down menu 500*e* is displayed by a double tap on the operation mode setting box 500*d*. Other operation modes can be set by sliding the pull-down menu 500*e* or an attached menu bar.

The flow subsequently proceeds to step S3. In step S3, it is determined whether the user has clicked (pressed) the execute button. When the execute button has been clicked (Yes in step S3), the flow proceeds to step S61. When the cancel button has been clicked (No in step S3), the control flow ends. As described above, the user executes the control flow by clicking the button displayed on the external input device 500 or the monitor 511.

In step S61. a maintenance operation that minimizes the influence of interference is performed in the operation mode that has been set by the user in step S2. When "PRODUCTION OPERATION" mode is selected, the flow proceeds to step S11. When "IMAGING DEVICE" mode is selected, the flow proceeds to step S21. When "TORQUE" mode is set, the flow proceeds to step S11'. When "PRESSURE SENSING OR CONTACT DETECTION" mode is selected, the flow proceeds to step S11". When "DISTANCE" mode is selected, the flow proceeds to step S11'''. Subsequently, the control processes described in the first to fifth embodiments are performed. The descriptions thereof are not repeated for simplicity of description.

The flow subsequently proceeds to step S62. In step S62, the result of performing the maintenance operation is displayed. FIGS. 13A and 13B illustrate illustrations of a result screen 500*f* according to the present embodiment. FIG. 13A illustrates the result screen 500*f* when maintenance operations have been performed with all the joints that have not been driven for the predetermined time.

FIG. 13B illustrates the result screen 500*f* when maintenance operations have not been performed with one of the joints that have not been driven for the predetermined time.

In FIGS. 13A and 13B, the result screen 500*f* is displayed as a pop-up window on the display 500*a*. An end button 500*g* and a redo button 500*h* are displayed on the result screen 500*f*. When the end button 500*g* is pressed (No in step S63), the control flow ends. When the redo button 500*h* is pressed (Yes in step S63), the flow returns to the point immediately before step S61, and a suggestion that the user execute a maintenance operation again is provided.

In FIG. 13A, an indication that maintenance operations have been performed with all the joints that have not been driven for the predetermined time is displayed. This indication allows the user to recognize that maintenance operations have been properly performed. In FIG. 13B, a notification that maintenance operations have not been performed with one of the joints that have not been driven for the predetermined time is displayed for the user. At this time, the user is also notified which joint has not been moved.

Figure 14:
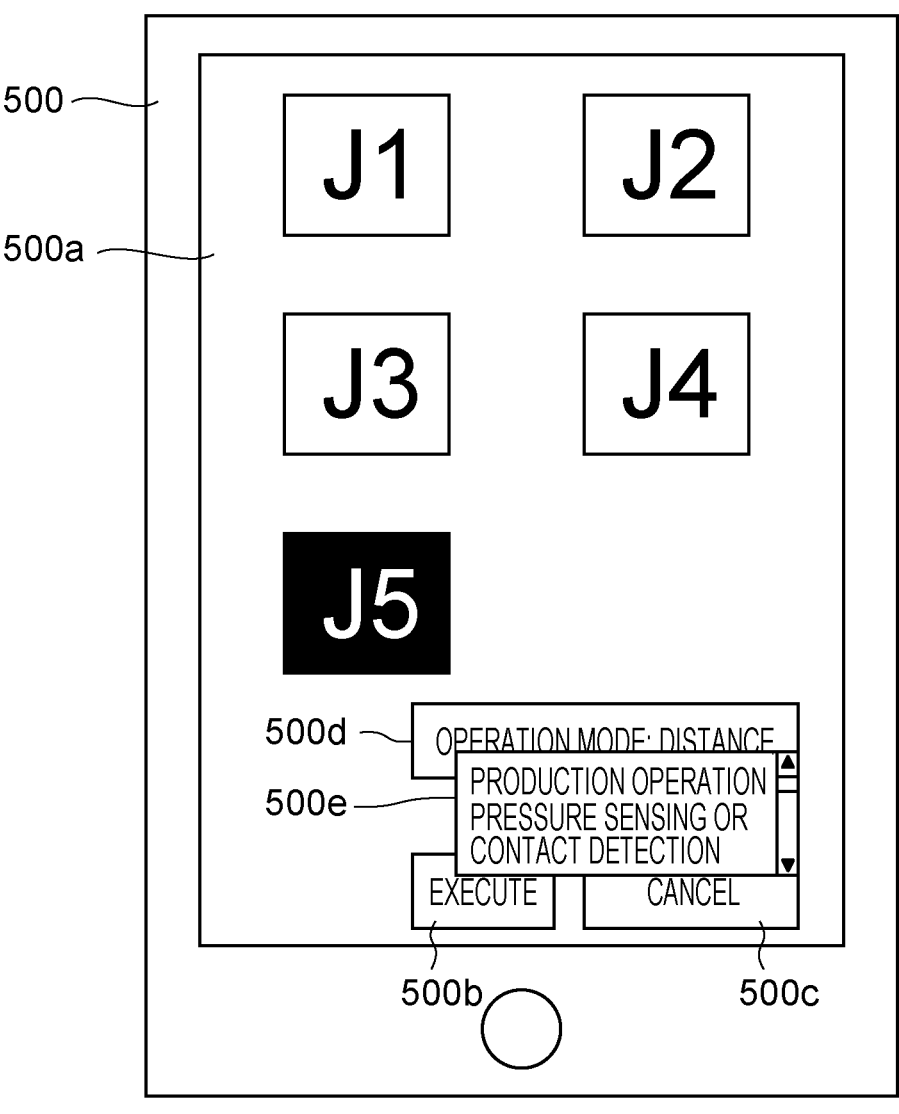
FIG. 14 illustrates an indication.

In the example in FIG. 13B, the notification indicates that the maintenance operation has not been performed with the joint J5. The maintenance operation cannot be completed when, due to the drive condition of the robot arm body 200 and the locations of surrounding objects, the joint cannot be moved across the drive range in the operation that minimizes the influence of interference (avoiding surrounding objects or moving along surrounding objects). The threshold for determining that the maintenance operation cannot be completed may be the entire drive range of the joint or any threshold that is set as appropriate, such as 70% of the drive range. The result screen 500*f* notifies the user of the joint with which maintenance operations have not been performed. This notification allows the user to properly identify the joint with which maintenance operations have not been performed. Additionally, the user is notified that the user is to select an operation mode again. This configuration enables effective execution of maintenance operations using multiple methods. Additionally, the user is notified that the user is to change the locations of surrounding objects. This configuration enables execution of maintenance operations when maintenance cannot be performed in the different operation modes. When maintenance operations are performed again, as illustrated in FIG. 14, the joint with which a maintenance operation has been performed is not highlighted on the screen displayed in step S2. This configuration enables the user to easily and visually identify the joint with which maintenance operations have not been performed.

As described above, in the present embodiment, when any joint has not been driven for the predetermined time, the user can execute the maintenance operation in the state in which no interference with surrounding objects occurs or, if interference occurs, the influence of the interference on the robot arm, the robot hand, and surrounding objects is minimized. It is possible to eliminate or minimize the influence of interference between the robot and surrounding objects when a maintenance operation is performed because a joint of the robot has not been driven for a certain period (the predetermined time). By eliminating or minimizing the influence of interference, users are encouraged to execute maintenance operations. Additionally, this configuration enables effective execution of maintenance operations using multiple methods. Additionally, the user is notified that the user is to change the locations of surrounding objects. This configuration enables execution of maintenance operations when maintenance cannot be performed in the different operation modes. The embodiment and modifications described above may be combined with the present embodiment and modifications.

OTHER EMBODIMENTS

Due to the positional relationships between the robot arm body 200 and the end effector, and surrounding objects, when moving a particular joint that has not been driven for the predetermined time is difficult, another joint may be moved in the manner that prevents interference with surrounding objects or minimizes the influence of interference. As a result, vibration is applied to the particular joint that has not been driven for the predetermined time. In this manner, a maintenance operation may be performed. It can be expected that the vibration can spread grease on the joint that has not been driven for the predetermined time. For example, when grease mostly spreads in the direction of gravity on a particular joint that has not been driven for the predetermined time because the joint has continuously borne the force of gravity, the joint is shaken in the direction of gravity using another joint. This configuration reduces the uneven distribution of grease in the direction of gravity, so that grease spreads more over the joint that has not been driven for the predetermined time.

Figure 15:
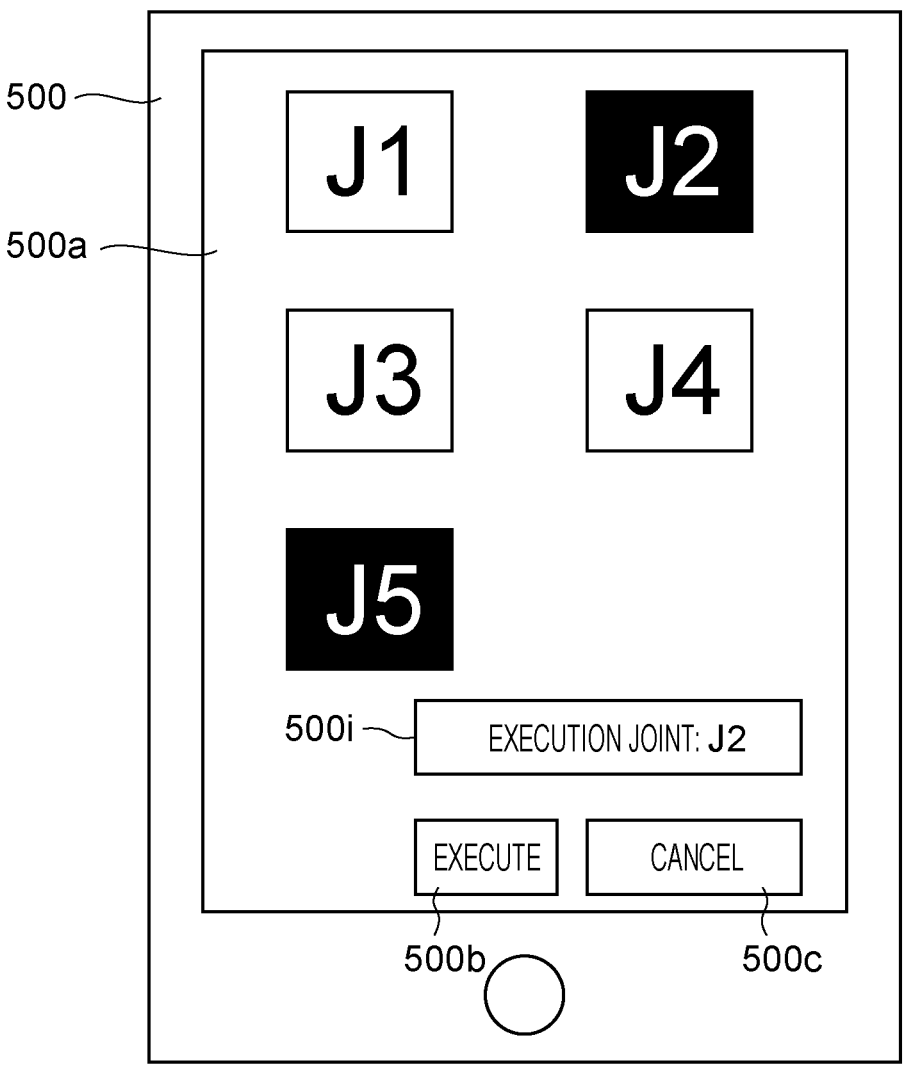
FIG. 15 illustrates an indication.

In the embodiments described above, when some joints have not been driven for the predetermined time, maintenance operations are performed with the joints. However, the user may set particular joints to perform maintenance. FIG. 15 illustrates an example in which an execution joint setting box 500*i* is displayed on the display 500*a*. By touching the boxes representing the joints J1 to J5, the touched joint is set on the execution joint setting box 500*i*. In the example in FIG. 15, as a result of the box of the joint J2 being touched, "J2" is displayed in the execution joint setting box 500*i*. While this state remains, if the box representing the joint J5 is touched, the touching triggers an update to display "J5" in the execution joint setting box 500*i*. In this update, in the case in which operations can be performed with one joint, only the joint J5 may be displayed in place of the joint J2. In the case in which operations can be performed with multiple joints, the joint J5 may be displayed together with the joint J2. By touching the box of a joint displayed in the execution joint setting box 500*i*, the joint is removed from the execution joint setting box 500*i*. The configuration described above further facilitates execution of maintenance operations by the user.

In the embodiments described above, the descriptions use as an example the case in which maintenance operations are performed at timings different from timings for performing production operations. However, while production operations are being repeatedly performed with the robot arm and the robot hand, maintenance operations may be performed concurrently when any joint that has not been driven for a predetermined time. A predetermined number of times that production operations are performed can be set as a threshold of the predetermined time. In this manner, maintenance operations can be performed while production operations are being performed. This configuration thus enables efficient execution of maintenance operations.

Specifically, the processing procedures of the embodiments described above are executed by a CPU. Thus, the processing procedures may be executed by reading a storage medium that stores a software program capable of implementing the functionalities described above and running the software program. In this case, because the program that is read from the storage medium implements the functionalities of the embodiments, the program and the storage medium storing the program are also embraced in the present disclosure.

In the embodiments described above, the case in which the computer-readable storage medium is a ROM, RAM, or flash memory, and the ROM, RAM, or flash memory stores the program has been described. However, the present disclosure is not limited to these memory types. The program implementing the present disclosure may be stored in any storage medium when the storage medium is computer-readable.

In the various embodiments described above, the case in which a multi-joint robot arm including multiple joints is used as the robot arm body 200 has been described, but the number of joints is not limited to this example. Although the vertically articulated architecture is used as the form of robot arm, the configurations described above can be implemented with other kinds of forms such as horizontally articulated, parallel-link, and Cartesian coordinate robots.

The various embodiments described above are applicable to machines capable of automatically performing expansion and contraction, bending and stretching, vertical movement, horizontal movement, or turning, or combinations of these operations, based on information in a storage device provided in a control device.

The present disclosure is not limited to the embodiments described above, and various modifications may be made without departing from the technical idea of the present disclosure. The effects described in the embodiments of the present disclosure represent only a selection of preferred effects of the present disclosure, and the present disclosure is not limited to the effects described in the embodiments.

The various embodiments and modifications described above may be combined in any manner.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-171844, filed Oct. 26, 2022, which is hereby incorporated by reference herein in its entirety.

What is claimed is:

1. A robot system comprising a robot with one or more joints, the robot being configured to, when a particular joint among the joints has not been driven for a predetermined time, be able to move the particular joint such that the robot comes into contact with the surrounding object while preventing a force applied to the robot from reaching a predetermined level or higher, and when the particular joint is moved, notify a user that an operation to move the particular joint is an operation designed with consideration of the contact between the robot and the surrounding object, and move the particular joint according to an input from the user.

2. The robot system according to claim 1, the robot being configured to, when the particular joint is moved, move the particular joint within an operation range of a preset production operation.

3. The robot system according to claim 2, the robot being configured to repeatedly perform the production operation, and while repeatedly performing the production operation, move the particular joint.

4. The robot system according to claim 1, the robot being configured to, when the particular joint is moved, in a case in which contact of the robot with the surrounding object is detected, stop the robot, change a position of the robot, and then move the particular joint.

5. The robot system according to claim 1, further comprising a simulator, the robot being configured to, when the particular joint is moved, move the particular joint in accordance with the simulator.

6. The robot system according to claim 1, further comprising an execute button configured to execute an operation of moving the particular joint, the robot being configured to move the particular joint in response to the execute button being pressed.

7. The robot system according to claim 1, further comprising a display unit configured to display information about the particular joint.

8. The robot system according to claim 7, wherein the display unit is configured to display an indication that enables a user to select any joint from the joints to move the selected joint.

9. The robot system according to claim 1, further comprising at least one selected from an imaging device, a first sensor configured to obtain information about force, a second sensor configured to obtain information about contact, and a third sensor configured to obtain information about distance, the robot being configured to, when the particular joint is moved, move the particular joint in accordance with the at least one of the imaging device, the first sensor, the second sensor, and the third sensor.

10. The robot system according to claim 9, the robot further comprising a display unit configured to, when the particular joint is moved, display an indication for selecting a mode using the production operation, a mode using the imaging device, a mode using the first sensor, a mode using the second sensor, or a mode using the third sensor.

11. The robot system according to claim 10, wherein the display unit is configured to display a notification suggesting that a user reselect a mode.

12. The robot system according to claim 1, further comprising a display unit configured to display a result of moving the particular joint.

13. The robot system according to claim 12, wherein the display unit is configured to, when the display unit displays the result, display information about the particular joint when it failed to move.

14. The robot system according to claim 12, wherein the display unit is configured to, when the display unit displays the result, display a notification suggesting that a user change a location of the surrounding object.

15. The robot system according to claim 1, the robot being configured to, when particular joints among the joints have not been driven for the predetermined time, move the particular joints one by one.

16. The robot system according to claim 1, the robot being configured to determine whether the particular joint is present, in accordance with at least one selected from a log data server, a programmable logic controller (PLC), and a timer.

17. The robot system according to claim 1, the robot being configured to, when the particular joint is moved, vibrate the particular joint using another joint different from the particular joint among the joints.

18. The robot system according to claim 1, wherein the predetermined time is one week or longer.

19. The robot system according to claim 1, the robot being configured to, when the particular joint is moved, firstly change to a standard position that prevents the robot from coming into contact with the surrounding object and subsequently move the particular joint.

20. An article manufacturing method for manufacturing an article using the robot according to claim 1.

21. A robot system control method for controlling a robot having one or more joints, comprising, when a particular joint among the joints has not been driven for a predetermined time, being able to move the particular joint such that the robot comes into contact with the surrounding object while preventing a force applied to the robot from reaching a predetermined level or higher, and when the particular joint is moved, notifying a user that an operation to move the particular joint is an operation designed with consideration of the contact between the robot and the surrounding object, and moving the particular joint according to an input from the user.

22. A non-transitory computer storage medium storing a control program that causes a computer to implement the control method according to claim 21.

23. The robot system according to claim 1, wherein the predetermined joint includes a speed reducer to which grease is applied, and wherein when the particular joint is moved, the particular joint is moved at a speed of 1000 to 3000 input rotations per minute of the speed reducer.

24. The robot system according to claim 1, wherein when the particular joint is moved, the speed reducer is moved for 20 minutes or more.

25. The robot system according to claim 1, wherein the predetermined joint includes a speed reducer to which grease is applied, and wherein the particular joint is moved at a speed lower than a speed in the preset production operation in order to spread the grease on the speed reducer.

26. The robot system according to claim 1, wherein the predetermined joint that has not been driven for the predetermined time is displayed on a display unit.

27. The robot system according to claim 1, wherein the predetermined joint is movable in a plurality of modes, and wherein a user's input for selecting a mode for moving the predetermined joint from the plurality of modes is acceptable.

\* \* \* \* \*